(12) United States Patent
Usui et al.

(10) Patent No.: US 10,209,494 B2
(45) Date of Patent: Feb. 19, 2019

(54) IMAGING OPTICAL SYSTEM

(71) Applicant: HOYA CORPORATION, Tokyo (JP)

(72) Inventors: Akitoshi Usui, Tokyo (JP); Yutaka Takakubo, Saitama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 16/108,825

(22) Filed: Aug. 22, 2018

(65) Prior Publication Data

US 2018/0364452 A1 Dec. 20, 2018

Related U.S. Application Data

(63) Continuation of application No. 15/450,456, filed on Mar. 6, 2017, now Pat. No. 10,082,648.

(30) Foreign Application Priority Data

Mar. 16, 2016 (JP) .................... 2016-052422

(51) Int. Cl.
*G02B 13/18* (2006.01)
*G02B 13/00* (2006.01)
(Continued)

(52) U.S. Cl.
CPC ............ *G02B 13/006* (2013.01); *G02B 9/60* (2013.01); *G02B 9/62* (2013.01); *G02B 9/64* (2013.01);
(Continued)

(58) Field of Classification Search
CPC .. G02B 13/0045; G02B 13/006; G02B 13/18; G02B 15/177; G02B 9/60; G02B 9/62;
(Continued)

(56) References Cited

U.S. PATENT DOCUMENTS 5,682,269 A * 10/1997 Kimura .................. G02B 9/60
359/752
6,088,169 A * 7/2000 Ohno .................. G02B 15/177
359/682
(Continued)

FOREIGN PATENT DOCUMENTS

JP 2004-354572 12/2004
JP 2005-10521 1/2005
(Continued)

OTHER PUBLICATIONS

Extended European Search Report issued in EP Appl. No. 17 16 0302.0 dated Aug. 7, 2017.

*Primary Examiner* — William R Alexander
*Assistant Examiner* — Balram T Parbadia
(74) *Attorney, Agent, or Firm* — Greenblum & Bernstein, P.L.C.

(57) ABSTRACT

An imaging optical system includes a positive or negative first lens group including a negative lens element closest to the object, a diaphragm, and a positive second lens group. The negative lens element closest to the object has an object-side aspherical surface including a paraxial convex surface, a paraxial curvature that is the greatest within the effective aperture, and a portion within the effective aperture having a curvature less than ½ of the paraxial curvature. These conditions are satisfied:

$R1/f < 1.35$ $D1/f > 0.4$ $-2.5 < f1/f < -1.3$ $V > 56$ (Continued)

"f" designates the overall focal length; f1, R1 and D1 respectively designate the focal length, paraxial radius of curvature of an object-side surface, and thickness, of the negative lens element closest to the object; and V designates the Abbe number regarding the d-line of a lens element, within the second lens group, closest to the diaphragm.

11 Claims, 13 Drawing Sheets

(51) Int. Cl.
  *G02B 15/177* (2006.01)
  *G02B 9/64* (2006.01)
  *G02B 9/62* (2006.01)
  *G02B 9/60* (2006.01)

(52) U.S. Cl.
  CPC ....... *G02B 13/002* (2013.01); *G02B 13/0045* (2013.01); *G02B 13/18* (2013.01); *G02B 15/177* (2013.01)

(58) Field of Classification Search
  CPC .......... G02B 13/004; G02B 9/34; G02B 9/64; G02B 9/58; G02B 13/002; G02B 13/0035
  See application file for complete search history.

(56) References Cited

U.S. PATENT DOCUMENTS

| | | | | |
|---|---|---|---|---|
| 6,825,993 | B2 * | 11/2004 | Noda | G02B 13/04 359/680 |
| 7,079,325 | B2 * | 7/2006 | Konno | G02B 15/177 359/682 |
| 7,636,205 | B2 * | 12/2009 | Yamamoto | G02B 9/34 359/740 |
| 76,360,205 | | 12/2009 | Yamamoto | |
| 7,746,572 | B2 * | 6/2010 | Asami | G02B 13/04 359/781 |
| 8,054,562 | B2 * | 11/2011 | Asami | G02B 13/16 359/752 |
| 8,081,391 | B1 * | 12/2011 | Kawana | G02B 15/177 359/680 |
| 8,228,611 | B2 * | 7/2012 | Lu | G02B 13/0035 359/649 |
| 8,355,215 | B2 * | 1/2013 | Asami | G02B 13/0045 359/756 |
| 8,416,511 | B2 * | 4/2013 | Asami | G02B 13/06 359/771 |
| 9,164,257 | B2 * | 10/2015 | Lin | G02B 13/0045 |
| 2003/0112529 | A1 * | 6/2003 | Sekita | G02B 13/04 359/770 |
| 2004/0008426 | A1 * | 1/2004 | Abe | G02B 9/60 359/770 |
| 2004/0257677 | A1 * | 12/2004 | Matsusaka | G02B 9/58 359/783 |
| 2008/0158695 | A1 * | 7/2008 | Tang | G02B 13/04 359/770 |
| 2008/0204902 | A1 * | 8/2008 | Obu | G02B 1/00 359/770 |
| 2012/0127598 | A1 * | 5/2012 | Katahira | G02B 9/34 359/770 |
| 2012/0229918 | A1 * | 9/2012 | Chen | G02B 13/0045 359/715 |
| 2012/0307382 | A1 * | 12/2012 | Hsu | G02B 9/60 359/770 |
| 2015/0022908 | A1 * | 1/2015 | Tomioka | G02B 9/64 359/751 |
| 2015/0268446 | A1 * | 9/2015 | Chen | G02B 9/62 348/148 |
| 2015/0271374 | A1 * | 9/2015 | Sun | G02B 13/04 348/335 |

FOREIGN PATENT DOCUMENTS

| | | |
|---|---|---|
| JP | 2011-85862 | 4/2011 |
| JP | 2011-145315 | 7/2011 |
| JP | 2015-18086 | 1/2015 |
| TW | I512327 | 12/2015 |
| WO | 2013/153792 | 10/2013 |
| WO | 2014/103200 | 7/2014 |

* cited by examiner

FNO.=1:1.66

— d Line
--- g Line
-- - C Line

-0.05  0.05
SPHERICAL
ABERRATION
CHROMATIC
ABERRATION

Y=3.82

-0.01  0.01
LATERAL
CHROMATIC
ABERRATION

Y=3.82

— S
--- M

-0.05  0.05
ASTIGMATISM

Y=3.82

-50.0  50.0%
DISTORTION

Fig.3
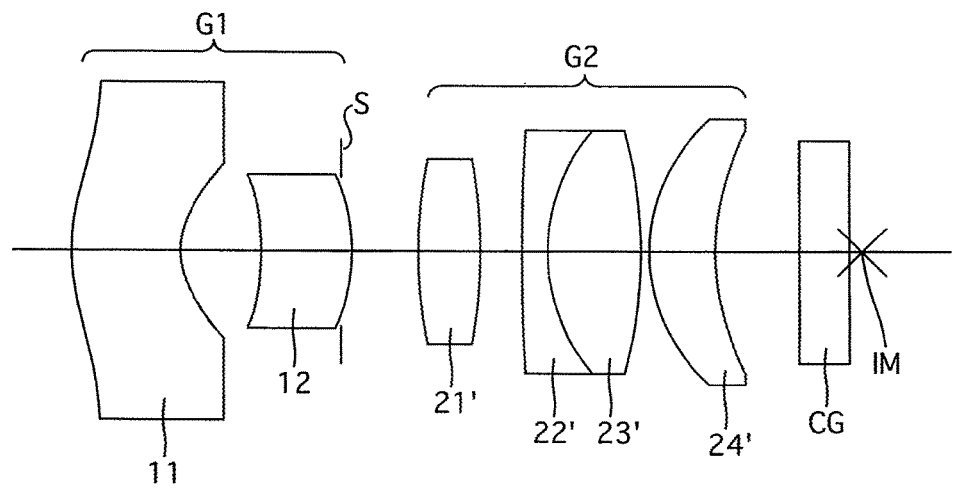
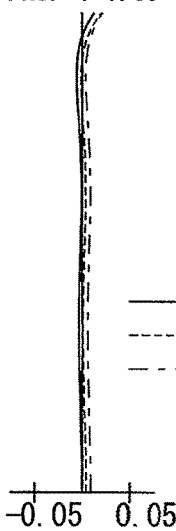
Fig.4A
FNO.=1:1.60
-0.05  0.05
SPHERICAL
ABERRATION
CHROMATIC
ABERRATION
——— d Line
------- g Line
— — C Line
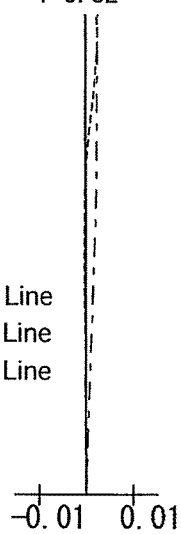
Fig.4B
Y=3.82
-0.01  0.01
LATERAL
CHROMATIC
ABERRATION
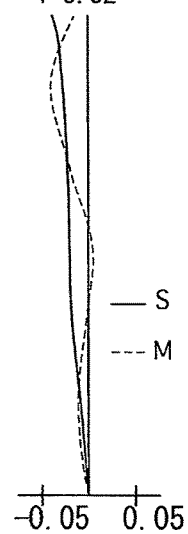
Fig.4C
Y=3.82
-0.05  0.05
ASTIGMATISM
——— S
--- M
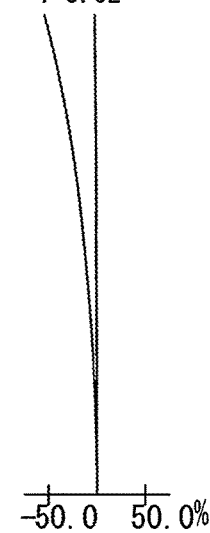
Fig.4D
Y=3.82
-50.0  50.0%
DISTORTION Fig.5
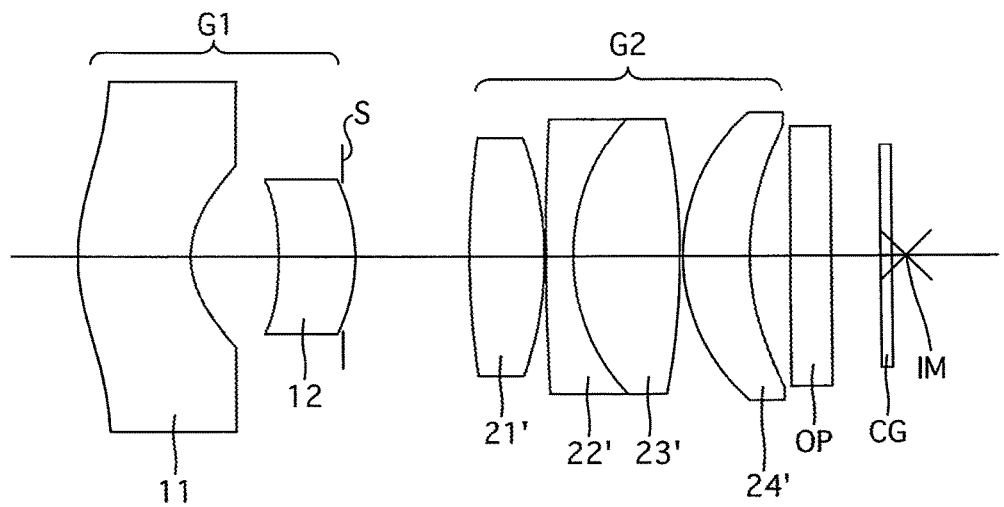
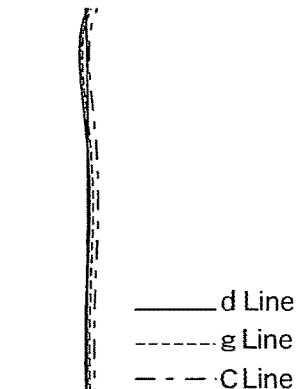
Fig.6A
FNO.=1:1.60
SPHERICAL
ABERRATION
CHROMATIC
ABERRATION
Fig.6B
Y=3.82
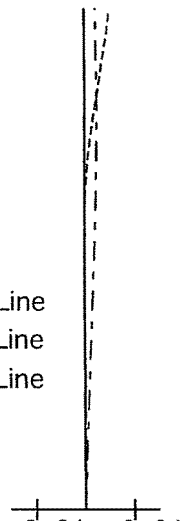
LATERAL
CHROMATIC
ABERRATION
Fig.6C
Y=3.82
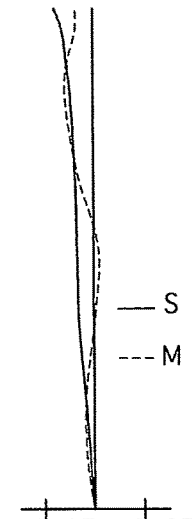
ASTIGMATISM
Fig.6D
Y=3.82
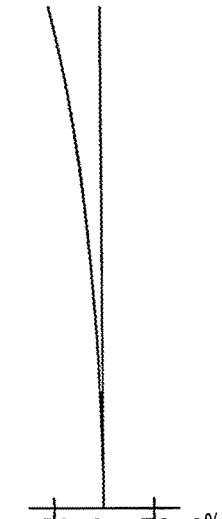
DISTORTION

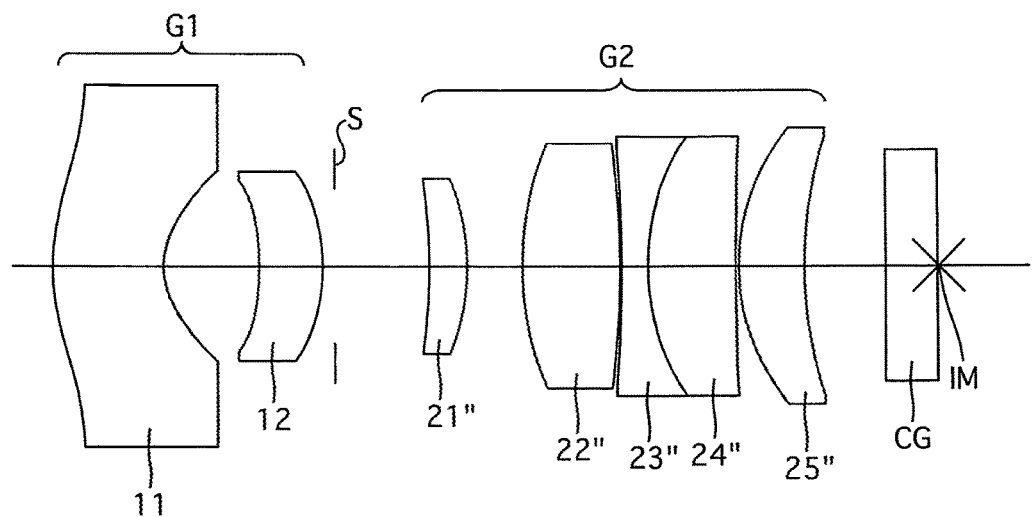
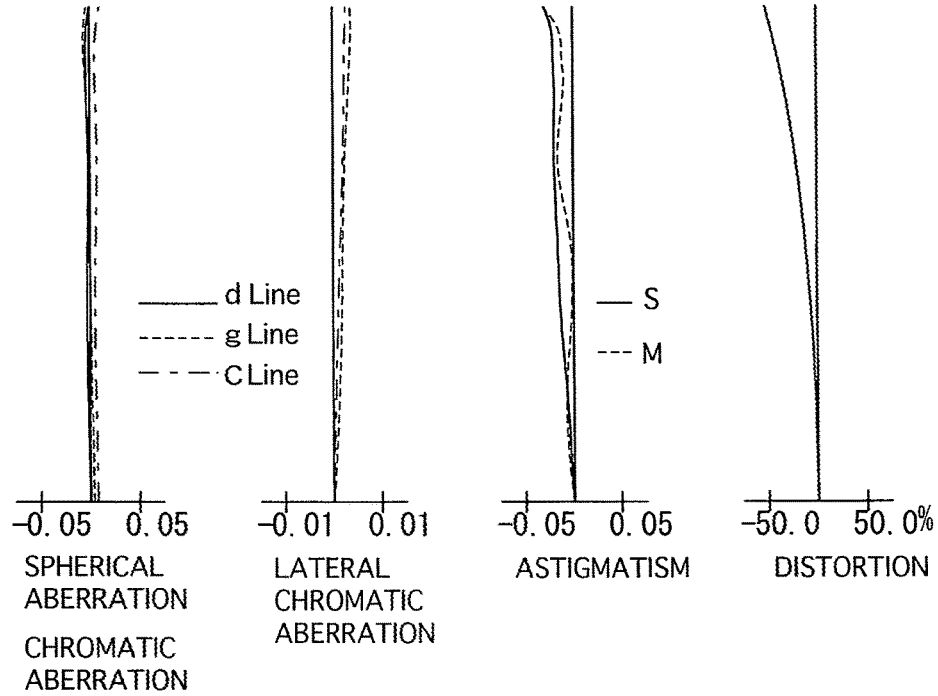

FNO.=1:1.60

Y=3.82

—— d Line
------ g Line
— — C Line

-0.05  0.05
SPHERICAL
ABERRATION
CHROMATIC
ABERRATION

-0.01  0.01
LATERAL
CHROMATIC
ABERRATION

Y=3.82

—— S
---- M

-0.05  0.05
ASTIGMATISM

Y=3.82

-50.0  50.0%
DISTORTION

Fig. 19
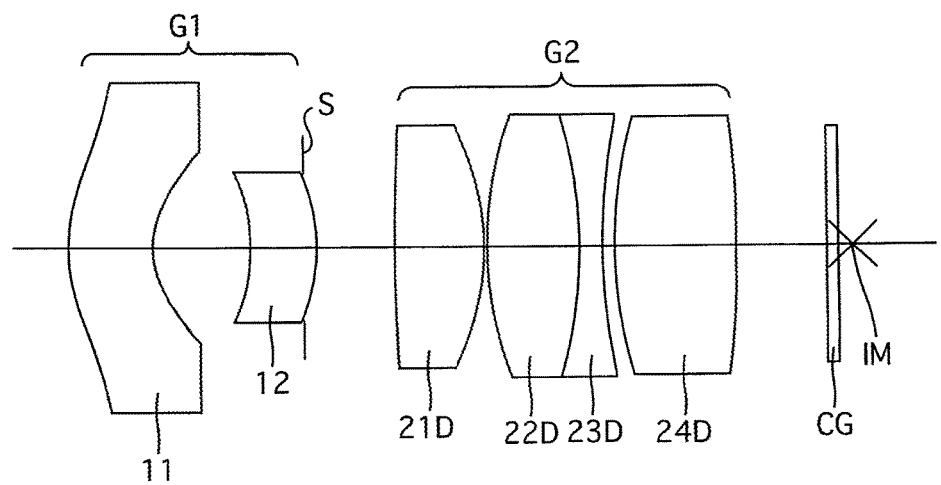
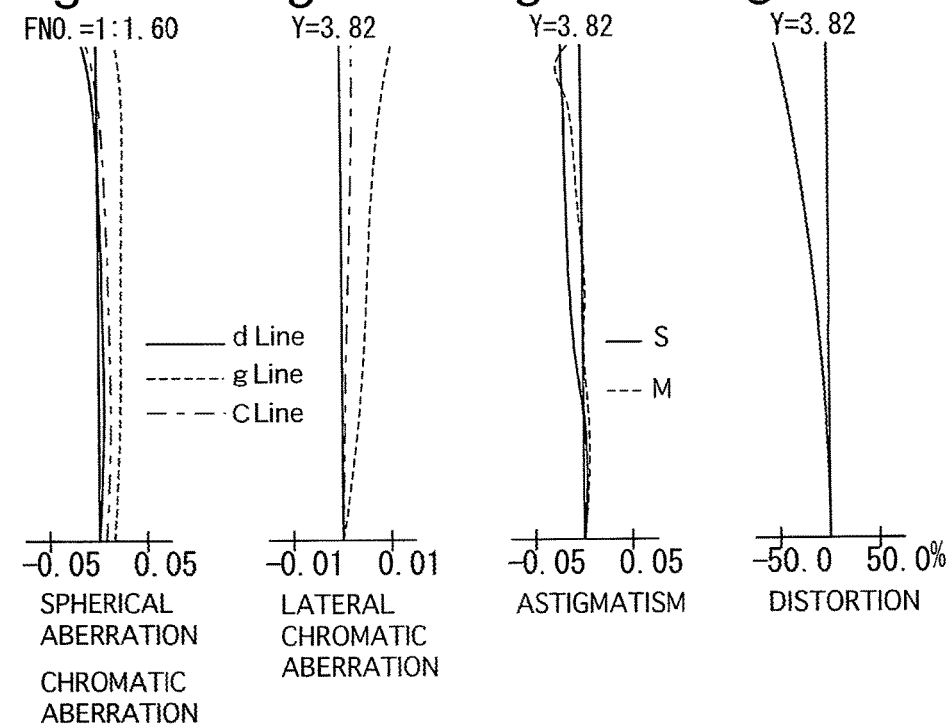

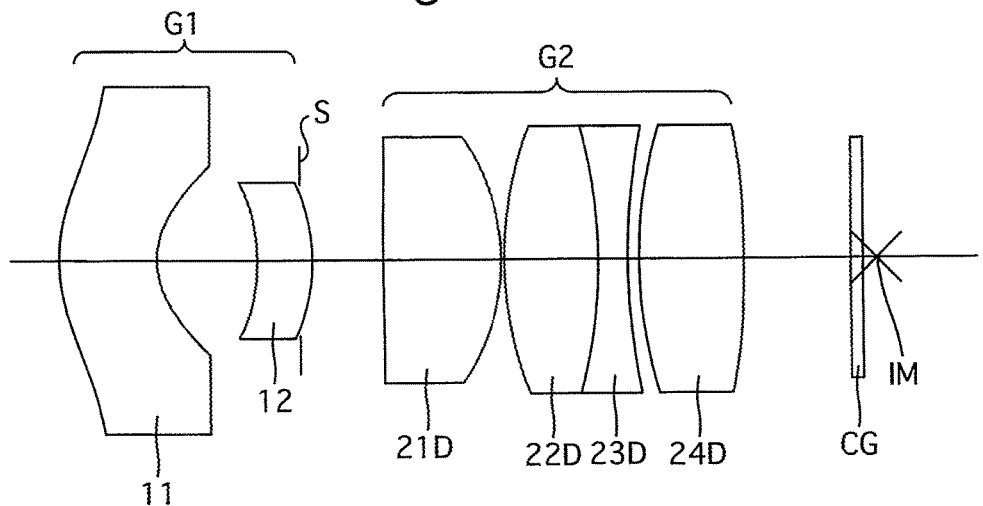
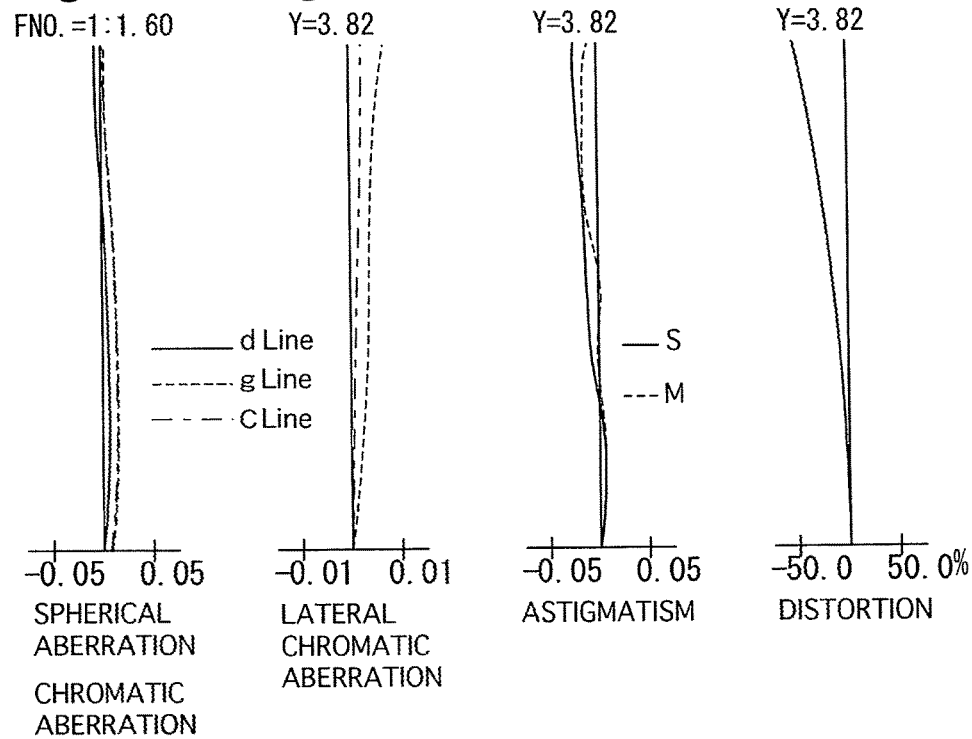

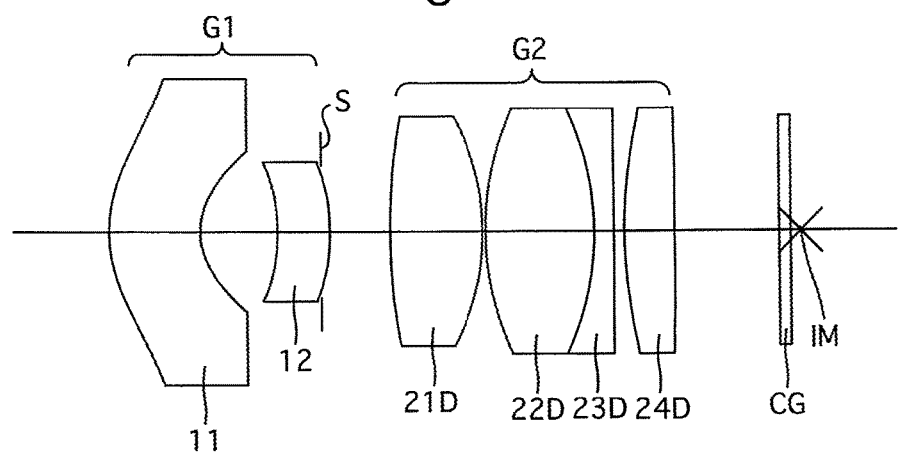
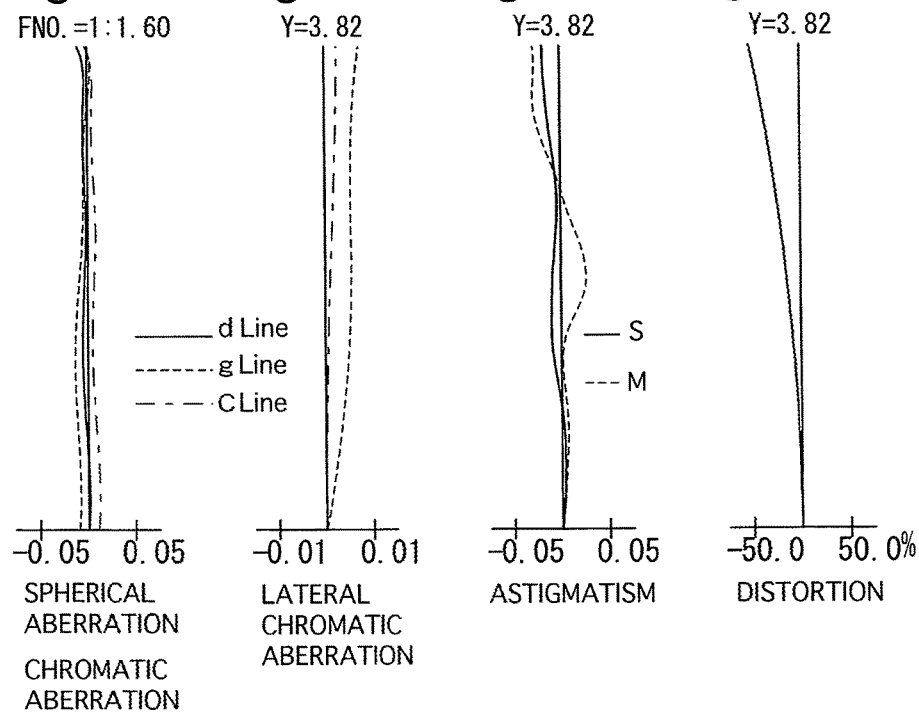

IMAGING OPTICAL SYSTEM

CROSS REFERENCE TO RELATED APPLICATIONS

This is a continuation application of U.S. patent application Ser. No. 15/450,456, filed Mar. 6, 2017, which claims the benefit of Japanese Patent Application No. 2016-052422, filed on Mar. 16, 2016. The entire disclosure of each of the above-identified applications, including the specification, drawings, and claims, is incorporated herein by reference in its entirety.

BACKGROUND OF THE INVENTION

1. Field of the Invention

The present invention relates to an imaging optical system which can be provided in an imaging apparatus such as, e.g., an in-vehicle camera, a surveillance camera, and a portable terminal (including a mobile phone, a smart phone or other smart devices).

2. Description of Related Art

An imaging optical system is known in the related art that can achieve both a wide angle-of-view and a higher definition of a telescopic image in a central area of a picture frame. Patent Literature 1 discloses an imaging optical system which achieves a wide angle-of-view by causing a large amount of negative distortion, and achieves an enlarged (and distorted) image in the central area of the picture frame.
Patent Literature 1: Japanese Unexamined Patent Publication No. 2005-010521.

However, in the imaging optical system of Patent Literature 1, the overall length of the imaging optical system becomes long when set to a large aperture; and if the overall length of the imaging optical system is shortened, there is the disadvantage of not being able to provide a large aperture ratio. For example, the fourth embodiment in Patent Literature 1 discloses an imaging optical system having a relatively large aperture having an f-number of about 1.8. However, the value of the overall length of the imaging optical system divided by the maximum image height is 9.8; hence, the overall length of the imaging optical system is long relative to the maximum image height. Whereas, in the first embodiment of Patent Literature 1, the value of the overall length of the imaging optical system divided by the maximum image height is 5.1, so that the overall length of the imaging optical system is short relative to the maximum image height; however, the f-number is 2.8, i.e., the aperture ratio is not very large.

SUMMARY OF THE INVENTION

The present invention has been devised in view of the above-described problems, and provides an imaging optical system which can achieve a wide angle-of-view while enlarging the object image at the central area of the picture screen, has a short overall length, has a large aperture, and various aberrations can be favorably corrected.

According to an aspect of the present invention, an imaging optical system is provided, including a positive or negative first lens group, an aperture diaphragm, and a positive second lens group, in that order from the object side. The first lens group includes a negative lens element provided closest to the object side within the first lens group. The negative lens element that is closest to the object side includes an aspherical surface on the object side thereof, the aspherical surface including a paraxial convex surface convexing toward the object side, a paraxial curvature (curvature of the central portion) that is the greatest within the effective aperture, and a portion within the effective aperture that has a curvature that is less than ½ of the paraxial curvature (curvature of the central portion). The following conditions (1), (2), (3) and (4) are satisfied:

$$R1/f<1.35 \quad (1),$$

$$D1/f>0.4 \quad (2),$$

$$-2.5<f1/f<-1.3 \quad (3),$$

and $$V>56 \quad (4),$$

wherein f designates the focal length of the imaging optical system, f1 designates the focal length of the negative lens element provided closest to the object side within the first lens group, R1 designates a paraxial radius of curvature of a surface on the object side (the radius of curvature of the paraxial convex surface) of the negative lens element provided closest to the object side within the first lens group, D1 designates a thickness, along the optical axis, of the negative lens element provided closest to the object side within the first lens group, and V designates the Abbe number with respect to the d-line of a lens element, within the second lens group, that is provided closest to the aperture diaphragm.

It is desirable for the following condition (4') to be satisfied within the scope of condition (4):

$$V>63 \quad (4').$$

In the present specification, in addition to the case where an aperture diaphragm is positioned between a surface closest to the image side on the first lens group and a surface closest to the object side on the second lens group, "a first lens group, an aperture diaphragm and a second lens group, in that order from the object side (in other words, an aperture diaphragm is provided between the first lens group and the second lens group)" also refers to the case where the aperture diaphragm is positioned on a plane that is orthogonal to the optical axis and is tangent to surface closest to the image side on the first lens group, or at a position that is slightly toward the object side from such a plane so that the aperture diaphragm and the first lens group overlap with respect to the optical axis direction; and also refers to the case where the aperture diaphragm is positioned on a plane that is orthogonal to the optical axis and is tangent to surface closest to the object side on the second lens group, or at a position that is slightly toward the image side from such a plane so that the aperture diaphragm and the second lens group overlap with respect to the optical axis direction.

In the present specification, "effective aperture of a lens element" refers to the maximum area of a light-ray passage of the lens element determined by light rays that pass through the lens element at a maximum position (distance) from the optical axis out of the light rays from the center (on the optical axis) of an image, formed by an optical system that includes the lens element, to the maximum image height.

It is desirable for the following condition (5) to be satisfied:

$$-0.45<f1/fg1<1 \quad (5),$$

wherein f1 designates the focal length of the negative lens element provided closest to the object side within the first lens group, and fg1 designates the focal length of the first lens group.

It is desirable for the following condition (6) to be satisfied:

$$0.3 < (R1-R2)/(R1+R2) < 0.55 \quad (6),$$

wherein R1 designates the paraxial radius of curvature of the surface on the object side (the radius of curvature of the paraxial convex surface) of the negative lens element provided closest to the object side within the first lens group, and R2 designates the paraxial radius of curvature of the surface on the image side of the negative lens element provided closest to the object side within the first lens group.

It is desirable for the first lens group to include a positive lens element behind the negative lens element provided closest to the object side within the first lens group.

It is desirable for the positive lens element that is provided behind the negative lens element provided closest to the object side, within the first lens group, to be a positive meniscus lens element having a convex surface on the image side.

It is desirable for the positive lens element that is provided behind the negative lens element provided closest to the object side, within the first lens group, to have an Abbe number of at least 35 with respect to the d-line.

It is desirable for the second lens group to include at least one positive lens element that has an Abbe number of at least 70 with respect to the d-line.

It is desirable for the second lens group to include at least one negative lens element that has an Abbe number of 20 or less with respect to the d-line.

According to the present invention, an imaging optical system is obtained, which can achieve a wide angle-of-view while enlarging the object image at the central area of the picture screen, has a short overall length, has a large aperture, and various aberrations can be favorably corrected.

The present disclosure relates to subject matter contained in Japanese Patent Application No. 2016-052422 (filed on Mar. 16, 2016) which is expressly incorporated herein in its entirety.

BRIEF DESCRIPTION OF THE DRAWINGS

The present invention will be discussed below in detail with reference to the accompanying drawings, in which:

FIG. 3 shows a lens arrangement of a second numerical embodiment of an imaging optical system, according to the present invention;

FIGS. 4A, 4B, 4C and 4D show various aberrations that occurred in the lens arrangement of FIG. 3;

FIG. 5 shows a lens arrangement of a third numerical embodiment of an imaging optical system, according to the present invention;

FIGS. 6A, 6B, 6C and 6D show various aberrations that occurred in the lens arrangement of FIG. 5;

FIG. 7 shows a lens arrangement of a fourth numerical embodiment of an imaging optical system, according to the present invention;

FIGS. 8A, 8B, 8C and 8D show various aberrations that occurred in the lens arrangement of FIG. 7;

FIG. 19 shows a lens arrangement of a tenth numerical embodiment of an imaging optical system, according to the present invention;

FIGS. 20A, 20B, 20C and 20D show various aberrations that occurred in the lens arrangement of FIG. 19;

FIG. 21 shows a lens arrangement of an eleventh numerical embodiment of an imaging optical system, according to the present invention;

FIGS. 22A, 22B, 22C and 22D show various aberrations that occurred in the lens arrangement of FIG. 21;

FIG. 25 shows a lens arrangement of a thirteenth numerical embodiment of an imaging optical system, according to the present invention; and FIGS. 26A, 26B, 26C and 26D show various aberrations that occurred in the lens arrangement of FIG. 25.

DESCRIPTION OF THE EMBODIMENTS

Figure 1:
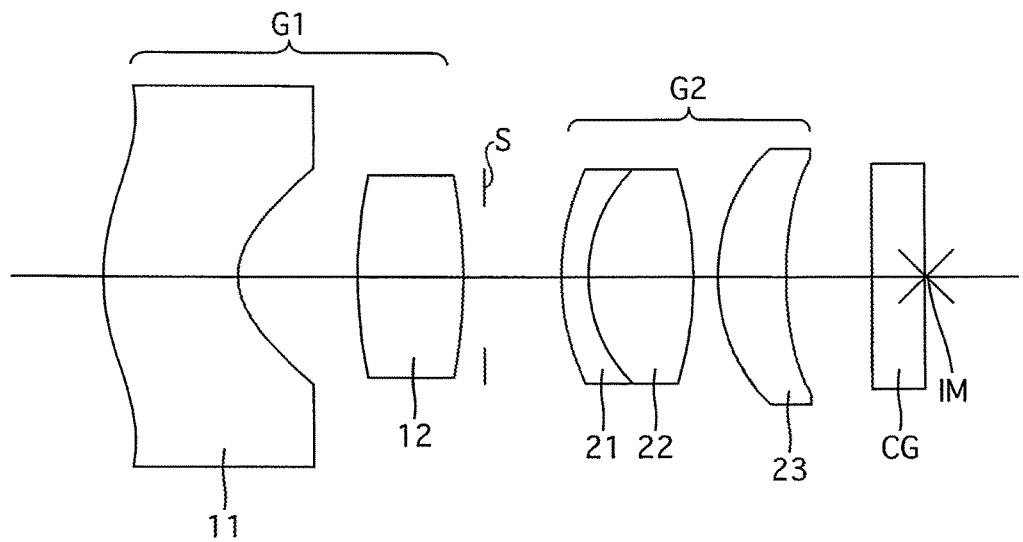
FIG. 1 shows a lens arrangement of a first numerical embodiment of an imaging optical system, according to the present invention.

The imaging optical system of the present invention is configured of a positive or negative first lens group G1, an aperture diaphragm S, and a positive second lens group G2, in that order from the object side. In each of the first and fifth numerical embodiments, the first lens group G1 has a positive refractive power. In each of the second through fourth and sixth through thirteenth numerical embodiments, the first lens group G1 has a negative refractive power. In each of the first, second, fourth, fifth and seventh through thirteenth numerical embodiments, a cover glass CG is provided between the second lens group G2 and an imaging surface IM. In each of the third and sixth numerical embodiments, an optical filter OP and a cover glass CG are provided between the second lens group G2 and the imaging surface IM.

In the first numerical embodiment, the first lens group G1 is configured of a negative lens element 11 formed from aspherical glass molded lens element (having an aspherical surface on each side thereof), and a positive lens element 12 formed from a spherical glass lens element, in that order from the object side. The aspherical surface on the object side of the negative lens element 11 includes a paraxial convex surface convexing toward the object side, a paraxial curvature (curvature of the central portion) that is the greatest within the effective aperture, and a portion within the effective aperture (at a peripheral portion other than the paraxial portion) that has a curvature that is less than ½ of the paraxial curvature (curvature of the central portion). The positive lens element 12 is a biconvex positive lens element.

In each of the second through fourth and sixth through thirteenth numerical embodiments, the first lens group G1 is configured of a negative lens element 11 formed from an aspherical glass molded lens element (having an aspherical surface on each side thereof), and a positive lens element 12 formed from aspherical glass molded lens element (having an aspherical surface on each side thereof), in that order from the object side. The aspherical surface on the object side of the negative lens element 11 includes a paraxial convex surface convexing toward the object side, a paraxial curvature (curvature of the central portion) that is the greatest within the effective aperture, and a portion within the effective aperture (at a peripheral portion other than the paraxial portion) that has a curvature that is less than ½ of the paraxial curvature (curvature of the central portion). The positive lens element 12 is a positive meniscus lens element having a convex surface on the image side.

In the fifth numerical embodiment, the first lens group G1 is configured of a negative lens element 11' formed from an aspherical glass molded lens element (having an aspherical surface on each side thereof), a positive lens element 12' formed from a spherical glass lens element, a negative lens element 13' formed from a spherical glass lens element, and a positive lens element 14' formed from a spherical glass lens element, in that order from the object side. The aspherical surface on the object side of the negative lens element 11' includes a paraxial convex surface convexing toward the object side, a paraxial curvature (curvature of the central portion) that is the greatest within the effective aperture, and a portion within the effective aperture (at a peripheral portion other than the paraxial portion) that has a curvature that is less than ½ of the paraxial curvature (curvature of the central portion). The positive lens element 12' is a positive meniscus lens element having a convex surface on the image side. The negative lens element 13' is a negative meniscus lens element having a convex surface on the image side. The positive lens element 14' is a biconvex positive lens element.

By providing the positive lens element 12 or 12' subsequently (immediately) behind the negative lens element 11 or 11', which is closest to the object side within the first lens group G1, the height of light rays of an abaxial light bundle incident on the negative lens element 11 or 11' can be reduced, and the diameter of the negative lens element 11 or 11' can also be reduced. Furthermore, by forming the positive lens element 12 or 12' as a positive meniscus lens element having a convex surface on the image side, a negative refractive power can be provided on the surface on the object side of the positive lens element 12 or 12', so that astigmatism and distortion can be favorably corrected. Furthermore, by setting the Abbe number with respect to the d-line of the positive lens element 12 or 12' to 35 or more, lateral chromatic aberration can be favorably corrected.

As shown in the first through thirteenth numerical embodiments that are described hereinafter, there is a certain degree of freedom in the configuration of the second lens group G2 in which a number of variations are possible. Among such variations, it is desirable for the second lens group G2 to include at least one positive lens element having an Abbe number of at least 70 with respect to the d-line and/or at least one negative lens element having an Abbe number of or less with respect to the d-line. By including a positive lens element using a low-dispersion glass having an Abbe number of at least 70, with respect to the d-line, within the second lens group G2, axial chromatic aberration can be favorably corrected. By including a negative lens element using a high-dispersion glass having an Abbe number of 20 or less, with respect to the d-line, within the second lens group G2, due to a synergistic effect of the positive lens element using a low-dispersion glass and the negative lens element using a high-dispersion glass, axial chromatic aberration can be more favorably corrected. Furthermore, since the refractive index of such a negative lens increases, the radius of curvature also increases, so that light-ray angle of incident on the image sensor can be made smaller.

A positive lens element or a negative lens element may be provided closest to the aperture diaphragm (S) side within the second lens group G2. For example, in the first numerical embodiment (described in detail later), a negative lens element (21) is provided closest to the aperture diaphragm (S) side within the second lens group G2, and in the second through thirteenth numerical embodiments (described in detail later), a positive lens element (21', 21", 21A, 21B, 21C or 21D) is provided closest to the aperture diaphragm (S) side within the second lens group G2.

In the imaging optical system of the illustrated embodiments, by reducing the effective aperture of the negative lens element 11 or 11' that is provided closest to the object side within the first lens group G1 and reducing the number of lens elements, the overall length of the imaging optical system can be shortened, and miniaturization of the imaging optical system, and consequently the imaging apparatus in which the imaging optical system is provided, can be achieved. Furthermore, the imaging optical system of the illustrated embodiments achieves an f-number (lens speed) of 1.6.

In the imaging optical system of the illustrated embodiments, in order to achieve a wide angle-of-view while enlarging the object image at the central area of the picture screen, the focal length, which determines the magnification of the central area of the lens, is increased and a wider angle-of-view is provided at the lens peripheral portion.

More specifically, the aspherical surface on the object side of the negative lens element 11 or 11', provided closest to the object side within the first lens group G1, has a profile that includes a paraxial convex surface convexing toward the object side, a paraxial curvature (curvature of the central portion) that is the greatest within the effective aperture, and a portion within the effective aperture (at a peripheral portion other than the paraxial portion) that has a curvature that is less than ½ of the paraxial curvature (curvature of the central portion). Accordingly, it is possible to generate negative distortion to thereby achieve a wide angle-of-view. The smaller the curvature of the above-mentioned "portion" of the negative lens element 11 or 11', provided closest to the object side within the first lens group G1 (in the case where the curvature is a negative value, the greater the absolute value of the negative curvature), the more advantageous the negative lens element 11 or 11' is for widening the angle-of-view. For example, the aspherical surface on the object side of the negative lens element 11 or 11' can have the greatest paraxial curvature (curvature of the central portion) within the effective aperture, and the curvature from a central portion toward the peripheral portion can be decreased and thereafter increased at an outermost peripheral portion.

Condition (1) specifies the ratio of the focal length of the entire lens system (imaging optical system) to the paraxial radius of curvature of the surface on the object side (the radius of curvature of the paraxial convex surface) of the negative lens element 11 or 11' that is provided closest to the object side within the first lens group G1. By satisfying condition (1), since the position of the principle point becomes distant from the imaging surface (imaging plane) IM (since the lateral magnification in regard to the optical system after the surface on the object side of the negative lens element 11 or 11' increases), the paraxial focal length of the entire optical system increases, so that the object image at a central portion (of the picture frame) can be enlarged.

If the upper limit of condition (1) is exceeded, it becomes difficult to form an enlarged object image at a central portion of the picture frame.

Condition (2) specifies the ratio of the focal length of the entire lens system (imaging optical system) to the thickness of the negative lens element 11 or 11', provided closest to the object side within the first lens group G1, along the optical axis. By satisfying condition (2), since the position of the principle point becomes distant from the imaging surface (imaging plane) IM (since the lateral magnification in regard to the optical system after the surface on the object side of the negative lens element 11 or 11' increases), the paraxial focal length of the entire optical system increases, so that the object image at a central portion (of the picture frame) can be enlarged.

If the lower limit of condition (2) is exceeded, it becomes difficult to form an enlarged object image at a central portion of the picture frame.

By satisfying conditions (1) and (2), the focal length, normalized by the image-sensor size, of the imaging optical system of the illustrated embodiments can be increased to 1.6 mm through 1.7 mm, so that the object image at a central portion (of the picture frame) can be enlarged.

Condition (3) specifies the ratio of the focal length of the entire lens system (imaging optical system) to the focal length of the negative lens element 11 or 11', provided closest to the object side within the first lens group G1. By satisfying condition (3), the overall length of the entire lens system (imaging optical system) can be shortened and the object image at a central portion (of the picture frame) can be enlarged.

If the upper limit of condition (3) is exceeded, the focal length of the negative lens element 11 or 11' becomes too short, so that the lateral magnification of the optical system thereafter (the remaining lens elements within the first lens group G1 and the second lens group G2) must be increased, thereby increasing the overall length of the entire lens system (imaging optical system).

If the lower limit of condition (3) is exceeded, it becomes difficult to form an enlarged object image at a central portion of the picture frame.

Conditions (4) and (4') specify the Abbe number with respect to the d-line of the lens element (21, 21', 21", 21A, 21B, 21C and 21D) provided closest to the aperture diaphragm S and within the second lens group G2. By satisfying condition (4), even if the refractive power of the lens element that bears most of the positive refractive power burden (within the second lens group G2) is increased, occurrence of axial chromatic aberration can be suppressed; therefore, an imaging optical system can be achieved which has an increased positive refractive power, thereby shortening the overall length of the lens system while achieving a large aperture and favorably correcting aberrations. The f-number of the imaging optical system of the illustrated embodiments is approximately 1.6, the value of the overall length of the imaging optical system divided by the maximum image height is approximately 6.3 through 9.9, and achieves a shortened overall length of the imaging optical system while having a larger aperture than that disclosed in the aforementioned Patent Literature 1. These functional effects are more prominent when condition (4') is satisfied.

If the lower limit of condition (4) is exceeded, it becomes difficult to achieve an imaging optical system which can have a large aperture and favorably correct various aberrations.

Condition (5) specifies the ratio of the focal length of the negative lens element 11 or 11' that is provided closest to the object side within the first lens group G1 to the focal length of the first lens group G1. By satisfying condition (5), the object image at a central portion (of the picture frame) can be enlarged, astigmatism can be favorably corrected, and the overall length of the lens system (imaging optical system) can be shortened.

If the specified range of condition (5) is exceeded, since the refractive power of the negative lens element 11 or 11' becomes small (weak), the focal length of the overall lens system (imaging optical system) becomes short, so that it becomes difficult to form an enlarged object image at a central portion of the picture frame.

Condition (6) specifies the shape (shaping factor) of the negative lens element 11 or 11' that is provided closest to the object side within the first lens group G1. By satisfying condition (6), the lens diameter of the negative lens element 11 or 11' can be reduced, the overall length of the lens system (imaging optical system) can be reduced, and an enlarged object image at a central portion can be formed over a wide range within the picture frame.

If the upper limit of condition (6) is exceeded, the lens diameter of the negative lens element 11 or 11' increases and the overall length of the lens system (imaging optical system) increases, so that it becomes difficult to form an enlarged object image at a central portion of the picture frame.

If the lower limit of condition (6) is exceeded, it becomes difficult to correct various aberrations.

NUMERICAL EMBODIMENTS

Specific numerical first through thirteenth embodiments will be herein discussed. In the aberration diagrams and the tables, the d-line, g-line and C-line show aberrations at their respective wave-lengths; S designates the sagittal image, M designates the meridional image, f designates the focal length of the entire optical system, Fno. designates the f-number, W designates the half angle of view (°), Y designates the image height (maximum image height), r designates the (paraxial) radius of curvature, d designates the lens thickness or distance between lenses, N(d) designates the refractive index at the d-line, and vd designates the Abbe number with respect to the d-line. The unit used for the various lengths is defined in millimeters (mm). The "Effective Aperture" in the lens data indicates a radius (a distance from the optical axis).

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

Figure 2A:
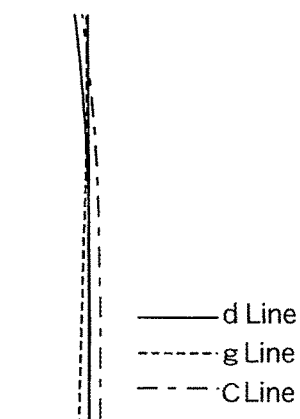
FIGS. 2A, 2B, 2C and 2D show various aberrations that occurred in the lens arrangement of FIG. 1.
Figure 2B:
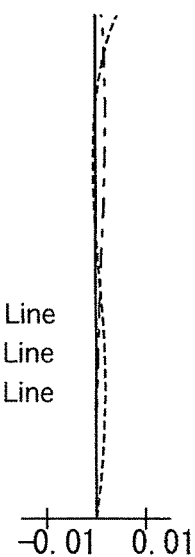
Figure 2C:
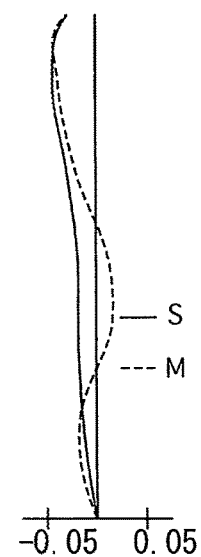
Figure 2D:
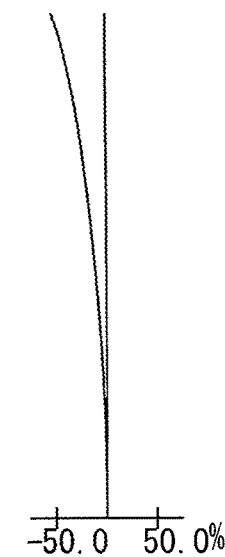

FIGS. 1 through 2D and Tables 1 through 4 show a first numerical embodiment of the imaging optical system, according to the present invention. FIG. 1 shows a lens arrangement of the imaging optical system. FIGS. 2A, 2B, 2C and 2D show various aberrations that occurred in the zoom lens system of FIG. 1. Table 1 indicates the surface data, Table 2 indicates various lens system data, Table 3 indicates focal length data, and Table 4 indicates aspherical surface data.

The imaging optical system of the first numerical embodiment is configured of a positive first lens group G1, an aperture diaphragm S, and a positive second lens group G2, in that order from the object side. A cover glass CG is provided between the second lens group G2 and an imaging surface IM.

The first lens group G1 is configured of a negative lens element 11 formed from an aspherical glass molded lens element (having an aspherical surface on each side thereof), and a positive lens element 12 formed from a spherical glass lens element, in that order from the object side. The aspherical surface on the object side of the negative lens element 11 includes a paraxial convex surface convexing toward the object side, a paraxial curvature (curvature of the central portion) that is the greatest within the effective aperture, and a portion within the effective aperture (at a peripheral portion other than the paraxial portion) that has a curvature that is less than ½ of the paraxial curvature (curvature of the central portion). The positive lens element 12 is a biconvex positive lens element.

The second lens group G2 is configured of a negative lens element 21 formed from a spherical glass lens element, a positive lens element 22 formed from a spherical glass lens element, and a positive lens element 23 formed from an aspherical glass molded lens element (having an aspherical surface on each side thereof), in that order from the object side. The negative lens element 21 is a negative meniscus lens element having a convex surface on the object side, the positive lens element 22 is a biconvex positive lens element, and the negative lens element (negative meniscus lens element) 21 and the positive lens element (biconvex positive lens element) 22 are cemented to each other. The positive lens element 23 is a positive meniscus lens element having a convex surface on the object side.

TABLE 1

SURFACE DATA

| Surf. No. | r | d | N(d) | vd | Effective Aperture |
|---|---|---|---|---|---|
| 1* | 6.968 | 4.936 | 1.58313 | 59.5 | 6.77 |
| 2* | 2.206 | 4.352 | | | 3.86 |
| 3 | 16.598 | 3.900 | 1.83481 | 42.7 | 3.62 |
| 4 | −19.444 | 0.788 | | | 3.07 |
| 5(Diaphragm) | ∞ | 2.834 | | | 2.55 |
| 6 | 8.751 | 1.000 | 1.94595 | 18.0 | 3.27 |

TABLE 1-continued

SURFACE DATA

| Surf. No. | r | d | N(d) | vd | Effective Aperture |
|---|---|---|---|---|---|
| 7 | 5.386 | 3.800 | 1.55032 | 75.5 | 3.30 |
| 8 | −12.923 | 0.889 | | | 3.83 |
| 9 | 6.749 | 2.500 | 1.55332 | 71.7 | 4.58 |
| 10* | 14.838 | 3.055 | | | 4.21 |
| 11* | ∞ | 1.900 | 1.51680 | 64.2 | 4.03 |
| 12 | ∞ | 0.045 | | | 3.93 |

IM(Imaging Surface)
The asterisk (*) designates an aspherical surface which is rotationally symmetrical with respect to the optical axis.

TABLE 2

VARIOUS LENS SYSTEM DATA

| f | 6.26 |
|---|---|
| FNO. | 1.66 |
| W | 50 |
| Y | 3.82 |

Curvature at central portion on surface on object side of negative lens element 11 (paraxial curvature/curvature of paraxial convex surface) [1/mm]: 0.14
Curvature at, or in the vicinity of, effective aperture of surface on the object side of the negative lens element 11 (i.e., an example curvature at an outermost peripheral portion) [1/mm]: −0.23
Focal length of entire optical system normalized by the image-sensor size: 1.64

TABLE 3

FOCAL LENGTH DATA

| Focal length of first lens group G1: | 140.686 |
|---|---|
| Focal length of second lens group G2: | 8.457 |
| Focal length of negative lens element 11: | −8.954 |
| Focal length of positive lens element 12: | 11.282 |
| Focal length of negative lens element 21: | −17.309 |
| Focal length of positive lens element 22: | 7.458 |
| Focal length of positive lens element 23: | 20.156 |

TABLE 4

ASPHERICAL SURFACE DATA

| Surf. No. | K | A4 | A6 |
|---|---|---|---|
| 1 | −1.000 | −5.92209E−04 | −3.49682E−05 |
| 2 | −1.000 | −1.83724E−03 | −2.77050E−04 |
| 10 | 0.000 | 3.35987E−05 | 2.07529E−05 |
| 11 | 0.000 | 6.61187E−04 | 2.50849E−05 |

| Surf. No. | A8 | A10 |
|---|---|---|
| 1 | 8.18439E−07 | −5.71683E−09 |
| 2 | 2.22940E−05 | −5.45134E−07 |
| 10 | −1.49260E−06 | 5.03668E−08 |
| 11 | −2.67851E−06 | 9.50132E−08 |

Numerical Embodiment 2

FIGS. 3 through 4D and Tables 5 through 8 show a second numerical embodiment of the imaging optical system, according to the present invention. FIG. 3 shows a lens arrangement of the imaging optical system. FIGS. 4A, 4B, 4C and 4D show various aberrations that occurred in the zoom lens system of FIG. 3. Table 5 indicates the surface data, Table 6 indicates various lens system data, Table 7 indicates focal length data, and Table 8 indicates aspherical surface data.

The second numerical embodiment has the same lens arrangement as that of the first numerical embodiment except for the following features:

(1) The first lens group G1 has a negative refractive power instead of a positive refractive power.

(2) The positive lens element 12 of the first lens group G1 is a positive meniscus lens element, having a convex surface on the image side, that is formed from an aspherical glass molded lens element (having an aspherical surface on each side thereof).

(3) The second lens group G2 is configured of a positive lens element 21' formed from a spherical glass lens element, a negative lens element 22' formed from a spherical glass lens element, a positive lens element 23' formed from a spherical glass lens element, and a positive lens element 24' formed from an aspherical glass molded lens element (having an aspherical surface on each side thereof), in that order from the object side. The positive lens element 21' is a biconvex positive lens element. The negative lens element 22' is a negative meniscus lens element having a convex surface on the object side, and the positive lens element 23' is a biconvex positive lens element. The negative lens element (negative meniscus lens element) 22' and the positive lens element (biconvex positive lens element) 23' are cemented to each other. The positive lens element 24' is a positive meniscus lens element having a convex surface on the object side.

TABLE 5

SURFACE DATA

| Surf. No. | r | d | N(d) | νd | Effective Aperture |
|---|---|---|---|---|---|
| 1* | 7.910 | 4.123 | 1.58313 | 59.5 | 6.30 |
| 2* | 2.860 | 3.109 | | | 3.27 |
| 3* | −11.725 | 3.500 | 1.82080 | 42.7 | 2.81 |
| 4* | −7.355 | −0.425 | | | 2.89 |
| 5(Diaphragm) | ∞ | 2.951 | | | 2.79 |
| 6 | 17.159 | 2.352 | 1.55032 | 75.5 | 3.05 |
| 7 | −19.003 | 1.610 | | | 3.47 |
| 8 | 75.691 | 1.000 | 1.92119 | 24.0 | 4.00 |
| 9 | 6.818 | 3.602 | 1.77250 | 49.6 | 4.26 |
| 10 | −16.803 | 0.307 | | | 4.55 |
| 11 | 6.239 | 2.480 | 1.55332 | 71.7 | 4.97 |
| 12* | 8.264 | 3.160 | | | 4.57 |
| 13* | ∞ | 1.900 | 1.51680 | 64.2 | 4.17 |
| 14 | ∞ | 0.045 | | | 3.93 |

IM(Imaging Surface)
The asterisk (*) designates an aspherical surface which is rotationally symmetrical with respect to the optical axis.

TABLE 6

VARIOUS LENS SYSTEM DATA

| | |
|---|---|
| f | 6.26 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.13

Curvature at, or in the vicinity of, effective aperture of surface on the object side of the negative lens element 11 (i.e., an example curvature at an outermost peripheral portion) [1/mm]: −0.03

Focal length of entire optical system normalized by the image-sensor size: 1.64

TABLE 7

FOCAL LENGTH DATA

| | |
|---|---|
| Focal length of first lens group G1: | −102.869 |
| Focal length of second lens group G2: | 8.661 |
| Focal length of negative lens element 11: | −10.988 |
| Focal length of positive lens element 12: | 17.663 |
| Focal length of positive lens element 21': | 16.772 |
| Focal length of negative lens element 22': | −8.192 |
| Focal length of positive lens element 23': | 6.726 |
| Focal length of positive lens element 24': | 32.045 |

TABLE 8

ASPHERICAL SURFACE DATA

| Surf. No. | K | A4 | A6 |
|---|---|---|---|
| 1 | −1.000 | −7.68189E−04 | −2.77245E−05 |
| 2 | −1.000 | −1.49875E−03 | −8.09204E−05 |
| 3 | −1.000 | −1.72566E−03 | −1.07195E−04 |
| 4 | −1.000 | −8.83476E−04 | −7.55926E−06 |
| 12 | 0.000 | −4.13067E−04 | 2.47787E−05 |
| 13 | 0.000 | −8.91090E−04 | 5.73049E−05 |

| Surf. No. | A8 | A10 |
|---|---|---|
| 1 | 9.23786E−07 | −7.66657E−09 |
| 2 | 1.72640E−07 | 5.18399E−07 |
| 3 | 2.37421E−06 | −3.39708E−07 |
| 4 | −2.28436E−06 | 1.33515E−07 |
| 12 | −1.66662E−06 | 3.17848E−08 |
| 13 | −3.97714E−06 | 9.35300E−08 |

Numerical Embodiment 3

FIGS. 5 through 6D and Tables 9 through 12 show a third numerical embodiment of the imaging optical system, according to the present invention. FIG. 5 shows a lens arrangement of the imaging optical system. FIGS. 6A, 6B, 6C and 6D show various aberrations that occurred in the zoom lens system of FIG. 5. Table 9 indicates the surface data, Table 10 indicates various lens system data, Table 11 indicates focal length data, and Table 12 indicates aspherical surface data.

The third numerical embodiment has the same lens arrangement as that of the second numerical embodiment except for the following feature:

(1) An optical filter OP is provided between the second lens group G2 and the cover glass CG.

TABLE 9

SURFACE DATA

| Surf. No. | r | d | N(d) | νd | Effective Aperture |
|---|---|---|---|---|---|
| 1* | 7.646 | 4.130 | 1.58313 | 59.5 | 6.27 |
| 2* | 2.816 | 3.190 | | | 3.25 |
| 3* | −11.666 | 2.800 | 1.82080 | 42.7 | 2.71 |
| 4* | −6.72 | −0.450 | | | 2.77 |
| 5 (Diaphragm) | ∞ | 4.690 | | | 2.66 |

TABLE 9-continued

SURFACE DATA

| Surf. No. | r | d | N(d) | vd | Effective Aperture |
|---|---|---|---|---|---|
| 6 | 28.126 | 2.770 | 1.55032 | 75.5 | 3.82 |
| 7 | −12.429 | 0.050 | | | 4.28 |
| 8 | 87.122 | 1.000 | 1.84666 | 23.8 | 4.48 |
| 9 | 7.147 | 3.870 | 1.77250 | 49.6 | 4.71 |
| 10 | −24.305 | 0.100 | | | 4.92 |
| 11 | 6.397 | 2.480 | 1.55332 | 71.7 | 5.16 |
| 12* | 8.146 | 1.500 | | | 4.72 |
| 13* | ∞ | 1.500 | 1.51680 | 64.2 | 4.66 |
| 14 | ∞ | 1.815 | | | 4.43 |
| 15 | ∞ | 0.400 | 1.51680 | 64.2 | 4.00 |
| 16 | ∞ | 0.045 | | | 3.93 |

IM(Imaging Surface)
The asterisk (*) designates an aspherical surface which is rotationally symmetrical with respect to the optical axis.

TABLE 10

VARIOUS LENS SYSTEM DATA

| f | 6.32 |
|---|---|
| FNO. | 1.60 |
| W | 50 |
| Y | 3.82 |

Curvature at central portion on surface on object side of negative lens element 11 (paraxial curvature/curvature of paraxial convex surface) [1/mm]: 0.13

Curvature at, or in the vicinity of, effective aperture of surface on the object side of the negative lens element 11 (i.e., an example curvature at an outermost peripheral portion) [1/mm]: −0.02

Focal length of entire optical system normalized by the image-sensor size: 1.65

TABLE 11

FOCAL LENGTH DATA

| Focal length of first lens group G1: | −469.168 |
|---|---|
| Focal length of second lens group G2: | 8.452 |
| Focal length of negative lens element 11: | −11.159 |
| Focal length of positive lens element 12: | 15.385 |
| Focal length of positive lens element 21': | 16.053 |
| Focal length of negative lens element 22': | −9.249 |
| Focal length of positive lens element 23': | 7.555 |
| Focal length of positive lens element 24': | 35.776 |

TABLE 12

ASPHERICAL SURFACE DATA

| Surf. No. | K | A4 | A6 |
|---|---|---|---|
| 1 | −1.000 | −7.72450E−04 | −2.88140E−05 |
| 2 | −1.000 | −1.61460E−03 | −1.10400E−04 |
| 3 | −1.000 | −2.04860E−03 | −1.21860E−04 |
| 4 | −1.000 | −1.14890E−03 | −1.75890E−05 |
| 12 | 0.000 | −3.55960E−04 | 2.60100E−05 |
| 13 | 0.000 | −9.01810E−04 | 6.93750E−05 |

| Surf. No. | A8 | A10 |
|---|---|---|
| 1 | 9.37390E−07 | −7.64410E−09 |
| 2 | 5.26170E−06 | 1.58100E−07 |
| 3 | 1.12110E−06 | −5.16890E−07 |
| 4 | −3.12460E−06 | 1.61930E−07 |

TABLE 12-continued

ASPHERICAL SURFACE DATA

| 12 | −1.42680E−06 | 2.25850E−08 |
|---|---|---|
| 13 | −4.07240E−06 | 7.98560E−08 |

Numerical Embodiment 4

FIGS. 7 through 8D and Tables 13 through 16 show a fourth numerical embodiment of the imaging optical system, according to the present invention. FIG. 7 shows a lens arrangement of the imaging optical system. FIGS. 8A, 8E, 8C and 8D show various aberrations that occurred in the zoom lens system of FIG. 7. Table 13 indicates the surface data, Table 14 indicates various lens system data, Table 15 indicates focal length data, and Table 16 indicates aspherical surface data.

The fourth numerical embodiment has the same lens arrangement as that of the first numerical embodiment except for the following features:

(1) The first lens group G1 has a negative refractive power instead of a positive refractive power.

(2) The positive lens element 12 of the first lens group G1 is a positive meniscus lens element, having a convex surface on the image side, that is formed from an aspherical glass molded lens element (having an aspherical surface on each side thereof).

(3) The second lens group G2 is configured of a positive lens element 21" formed from a spherical glass lens element, a positive lens element 22" formed from a spherical glass lens element, a negative lens element 23" formed from a spherical glass lens element, a positive lens element 24" formed from a spherical glass lens element, and a positive lens element 25" formed from a spherical glass lens element, in that order from the object side. The positive lens element 21" is a positive meniscus lens element having a convex surface on the image side. The positive lens element 22" is a biconvex positive lens element. The negative lens element 23" is a biconcave negative lens element and the positive lens element 24" is a positive meniscus lens element having a convex surface on the object side; the negative lens element (biconcave negative lens element) 23" and the positive lens element (positive meniscus lens element) 24" are cemented to each other. The positive lens element 25" is a positive meniscus lens element having a convex surface on the object side.

TABLE 13

SURFACE DATA

| Surf. No. | r | d | N(d) | vd | Effective Aperture |
|---|---|---|---|---|---|
| 1* | 7.838 | 4.070 | 1.58313 | 59.5 | 6.57 |
| 2* | 2.767 | 3.553 | | | 3.46 |
| 3* | −9.748 | 2.360 | 1.82080 | 42.7 | 3.11 |
| 4* | −7.041 | 0.452 | | | 3.42 |
| 5 (Diaphragm) | ∞ | 3.519 | | | 2.82 |
| 6 | −21.951 | 1.424 | 1.55032 | 75.5 | 3.08 |
| 7 | −8.208 | 2.096 | | | 3.18 |
| 8 | 10.873 | 3.676 | 1.55032 | 75.5 | 4.28 |
| 9 | −32.839 | 0.050 | | | 4.43 |
| 10 | −56.671 | 1.000 | 1.84666 | 23.8 | 4.43 |
| 11 | 8.367 | 3.259 | 1.77250 | 49.6 | 4.55 |
| 12 | 124.293 | 0.100 | | | 4.71 |
| 13 | 7.775 | 2.430 | 1.77250 | 49.6 | 5.03 |
| 14 | 15.057 | 3.000 | | | 4.68 |

TABLE 13-continued

SURFACE DATA

| Surf. No. | r | d | N(d) | vd | Effective Aperture |
|---|---|---|---|---|---|
| 15 | ∞ | 1.900 | 1.51680 | 64.2 | 4.20 |
| 16 | ∞ | 0.045 | | | 3.93 |

IM(Imaging Surface)
The asterisk (*) designates an aspherical surface which is rotationally symmetrical with respect to the optical axis.

TABLE 14

VARIOUS LENS SYSTEM DATA

| f | 6.26 |
|---|---|
| FNO. | 1.60 |
| W | 50 |
| Y | 3.82 |

Curvature at central portion on surface on object side of negative lens element 11 (paraxial curvature/curvature of paraxial convex surface) [1/mm]: 0.13
Curvature at, or in the vicinity of, effective aperture of surface on the object side of the negative lens element 11 (i.e., an example curvature at an outermost peripheral portion) [1/mm]: −0.01
Focal length of entire optical system normalized by the image-sensor size: 1.64

TABLE 15

FOCAL LENGTH DATA

| Focal length of first lens group G1: | −33.746 |
|---|---|
| Focal length of second lens group G2: | 8.609 |
| Focal length of negative lens element 11: | −10.417 |
| Focal length of positive lens element 12: | 22.171 |
| Focal length of positive lens element 21": | 7.838 |
| Focal length of positive lens element 22": | 15.300 |
| Focal length of negative lens element 23": | −8.551 |
| Focal length of positive lens element 24": | 11.473 |
| Focal length of positive lens element 25": | 18.168 |

TABLE 16

ASPHERICAL SURFACE DATA

| Surf. No. | K | A4 | A6 |
|---|---|---|---|
| 1 | −1.000 | −6.89798E−04 | −2.32004E−05 |
| 2 | −1.000 | −4.96111E−04 | −1.16038E−04 |
| 3 | −1.000 | −1.45785E−03 | −8.37288E−05 |
| 4 | −1.000 | −9.21826E−04 | −2.13943E−05 |

| Surf. No. | A8 | A10 |
|---|---|---|
| 1 | 6.59414E−07 | −4.66118E−09 |
| 2 | 6.54900E−06 | −4.91580E−08 |
| 3 | 4.66001E−08 | −3.99011E−07 |
| 4 | −1.49741E−06 | 2.91835E−08 |

Numerical Embodiment 5

Figure 9:
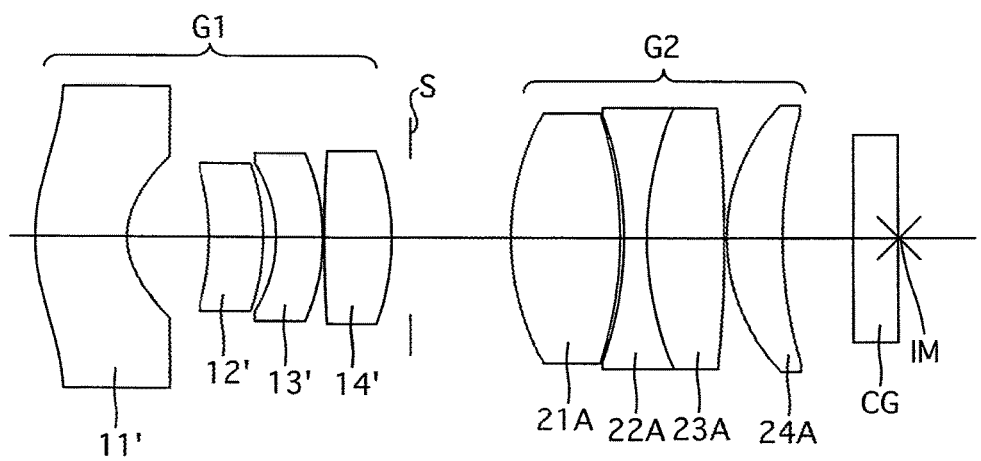
FIG. 9 shows a lens arrangement of a fifth numerical embodiment of an imaging optical system, according to the present invention.
Figures 10A, 10B, 10C, 10D:
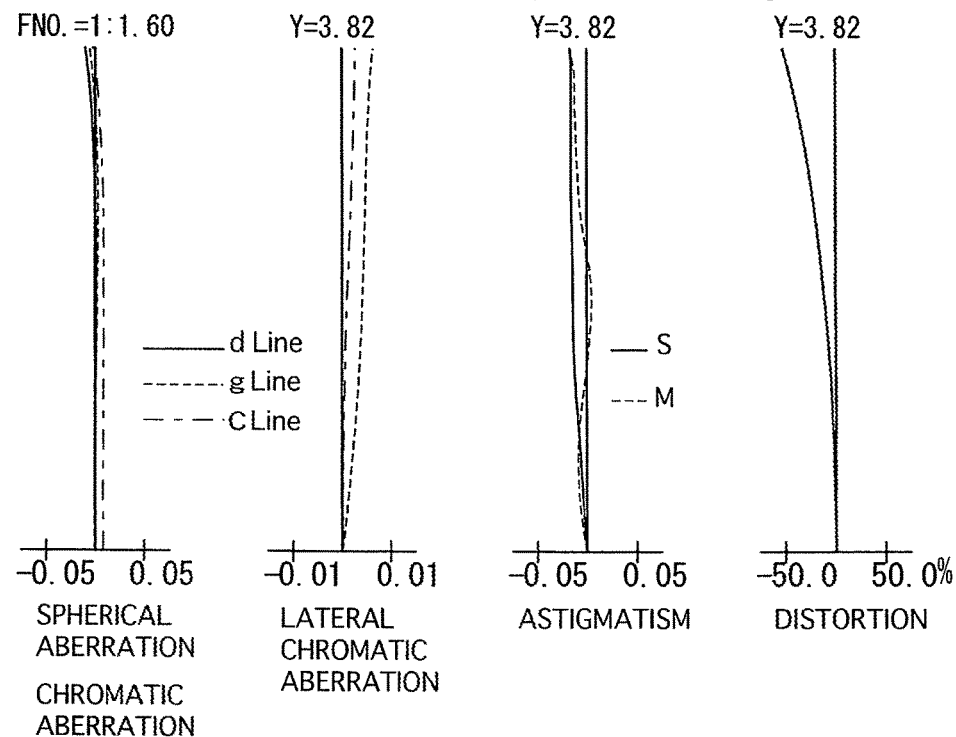
FIGS. 10A, 10B, 10C and 10D show various aberrations that occurred in the lens arrangement of FIG. 9.

FIGS. 9 through 10D and Tables 17 through 20 show a fifth numerical embodiment of the imaging optical system, according to the present invention. FIG. 9 shows a lens arrangement of the imaging optical system. FIGS. 10A, 10B, 10C and 10D show various aberrations that occurred in the zoom lens system of FIG. 9. Table 17 indicates the surface data, Table 18 indicates various lens system data, Table 19 indicates focal length data, and Table 20 indicates aspherical surface data.

The fifth numerical embodiment has the same lens arrangement as that of the first numerical embodiment except for the following features:

(1) The first lens group G1 is configured of a negative lens element 11' formed from an aspherical glass molded lens element (having an aspherical surface on each side thereof), a positive lens element 12' formed from a spherical glass lens element, a negative lens element 13' formed from a spherical glass lens element, and a positive lens element 14' formed from a spherical glass lens element, in that order from the object side. The aspherical surface on the object side of the negative lens element 11' includes a paraxial convex surface convexing toward the object side, a paraxial curvature (curvature of the central portion) that is the greatest within the effective aperture, and a portion within the effective aperture (at a peripheral portion other than the paraxial portion) that has a curvature that is less than ½ of the paraxial curvature (curvature of the central portion). The positive lens element 12' is a positive meniscus lens element having a convex surface on the image side. The negative lens element 13' is a negative meniscus lens element having a convex surface on the image side. The positive lens element 14' is a biconvex positive lens element.

(2) The second lens group G2 is configured of a positive lens element 21A formed from a spherical glass lens element, a negative lens element 22A formed from a spherical glass lens element, a positive lens element 23A formed from spherical glass lens element and a positive lens element 24A formed from spherical glass lens element, in that order from the object side. The positive lens element 21A is a biconvex positive lens element. The negative lens element 22A is a biconcave negative lens element, and the positive lens element 23A is a biconvex positive lens element; the negative lens element (biconcave negative lens element) 22A and the positive lens element (biconvex positive lens element) 23A are cemented to each other. The positive lens element 24A is a positive meniscus lens element having a convex surface on the object side.

TABLE 17

SURFACE DATA

| Surf. No. | r | d | N(d) | vd | Effective Aperture |
|---|---|---|---|---|---|
| 1* | 8.260 | 4.070 | 1.58313 | 59.5 | 6.46 |
| 2* | 3.081 | 3.579 | | | 3.45 |
| 3 | −10.417 | 2.360 | 1.91082 | 35.3 | 2.88 |
| 4 | −9.252 | 0.571 | | | 3.17 |
| 5 | −5.782 | 2.066 | 1.55032 | 75.5 | 3.16 |
| 6 | −8.688 | 0.050 | | | 3.60 |
| 7 | 53.769 | 3.000 | 1.55032 | 75.5 | 3.67 |
| 8 | −9.907 | 0.850 | | | 3.71 |
| 9 (Diaphragm) | ∞ | 4.441 | | | 3.38 |
| 10 | 10.713 | 4.792 | 1.55032 | 75.5 | 5.36 |
| 11 | −16.979 | 0.165 | | | 5.32 |
| 12 | −15.718 | 1.000 | 1.84666 | 23.8 | 5.29 |
| 13 | 13.53 | 3.449 | 1.77250 | 49.6 | 5.45 |
| 14 | −51.443 | 0.100 | | | 5.59 |
| 15 | 8.178 | 2.430 | 1.77250 | 49.6 | 5.70 |
| 16 | 18.668 | 3.046 | | | 5.38 |
| 17 | ∞ | 1.900 | 1.51680 | 64.2 | 4.44 |
| 18 | ∞ | 0.045 | | | 3.94 |

IM(Imaging Surface)
The asterisk (*) designates an aspherical surface which is rotationally symmetrical with respect to the optical axis.

TABLE 18

VARIOUS LENS SYSTEM DATA

| | |
|---|---|
| f | 6.26 |
| FNO. | 1.60 |
| W | 50 |
| Y | 3.82 |

Curvature at central portion on surface on object side of negative lens element 11' (paraxial curvature/curvature of paraxial convex surface) [1/mm]: 0.12
Curvature at, or in the vicinity of, effective aperture of surface on the object side of the negative lens element 11' (i.e., an example curvature at an outermost peripheral portion) [1/mm]: −0.07
Focal length of entire optical system normalized by the image-sensor size: 1.64

TABLE 19

FOCAL LENGTH DATA

| | |
|---|---|
| Focal length of first lens group G1: | 28.746 |
| Focal length of second lens group G2: | 11.505 |
| Focal length of negative lens element 11': | −11.857 |
| Focal length of positive lens element 12': | 46.207 |
| Focal length of negative lens element 13': | −42.015 |
| Focal length of positive lens element 14': | 15.460 |
| Focal length of positive lens element 21A: | 12.717 |
| Focal length of negative lens element 22A: | −8.455 |
| Focal length of positive lens element 23A: | 14.196 |
| Focal length of positive lens element 24A: | 17.112 |

TABLE 20

ASPHERICAL SURFACE DATA

| Surf. No. | K | A4 | A6 |
|---|---|---|---|
| 1 | −1.000 | −5.72301E−04 | −1.78820E−05 |
| 2 | −1.000 | −3.69277E−04 | −5.68434E−05 |

| Surf. No. | A8 | A10 |
|---|---|---|
| 1 | 4.64073E−07 | −3.16690E−09 |
| 2 | 2.03815E−06 | 1.39353E−07 |

Numerical Embodiment 6

Figure 11:
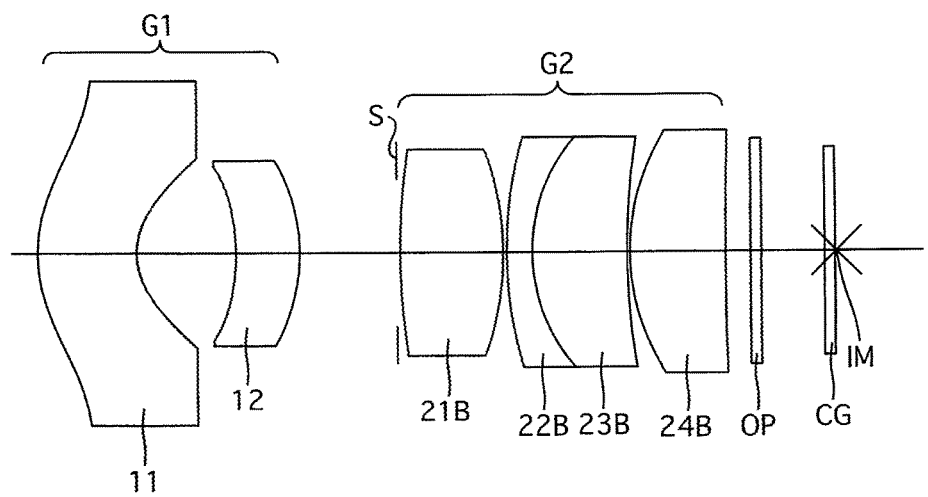
FIG. 11 shows a lens arrangement of a sixth numerical embodiment of an imaging optical system, according to the present invention.
Figure 12A:
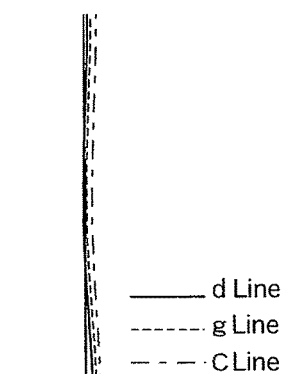
FIGS. 12A, 12B, 12C and 12D show various aberrations that occurred in the lens arrangement of FIG. 11.
Figure 12B:
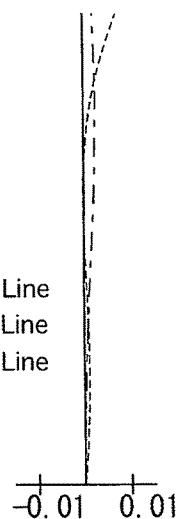
Figure 12C:
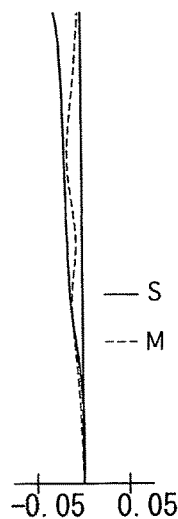
Figure 12D:
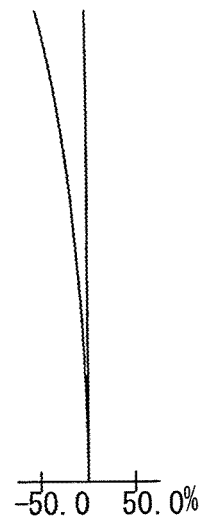

FIGS. 11 through 12D and Tables 21 through 24 show a sixth numerical embodiment of the imaging optical system, according to the present invention. FIG. 11 shows a lens arrangement of the imaging optical system. FIGS. 12A, 12B, 12C and 12D show various aberrations that occurred in the zoom lens system of FIG. 11. Table 21 indicates the surface data, Table 22 indicates various lens system data, Table 23 indicates focal length data, and Table 24 indicates aspherical surface data.

The sixth numerical embodiment has the same lens arrangement as that of the first numerical embodiment except for the following features:

(1) The first lens group G1 has a negative refractive power instead of a positive refractive power.
(2) The positive lens element 12 of the first lens group G1 is a positive meniscus lens element, having a convex surface on the image side, that is formed from an aspherical glass molded lens element (having an aspherical surface on each side thereof).
(3) The second lens group G2 is configured of a positive lens element 21B formed from a spherical glass lens element, a negative lens element 22B formed from a spherical glass lens element, a positive lens element 23B formed from a spherical glass lens element, and a positive lens element 24B formed from spherical glass lens element, in that order from the object side. The positive lens element 21B is a biconvex positive lens element. The negative lens element 22B is a negative meniscus lens element having a convex surface on the object side, and the positive lens element 23B is a positive meniscus lens element having a convex surface on the object side; the negative lens element (negative meniscus lens element) 22B and the positive lens element (positive meniscus lens element) 23B are cemented to each other. The positive lens element 24B is a positive meniscus lens element having a convex surface on the object side.
(4) An optical filter OP is provided between the second lens group G2 and the cover glass CG.

TABLE 21

SURFACE DATA

| Surf. No. | r | d | N(d) | vd | Effective Aperture |
|---|---|---|---|---|---|
| 1* | 5.661 | 3.869 | 1.58313 | 59.5 | 6.59 |
| 2* | 2.445 | 3.918 | | | 3.61 |
| 3* | −8.553 | 2.500 | 1.88202 | 37.2 | 3.30 |
| 4* | −7.324 | 0.340 | | | 3.52 |
| 5 (Diaphragm) | ∞ | 3.569 | | | 2.95 |
| 6 | 25.08 | 4.100 | 1.55032 | 75.5 | 2.99 |
| 7 | −10.986 | 0.138 | | | 3.93 |
| 8 | 15.231 | 1.000 | 1.92286 | 20.9 | 4.29 |
| 9 | 6.525 | 3.734 | 1.77250 | 49.6 | 4.25 |
| 10 | 28.103 | 0.100 | | | 4.38 |
| 11 | 8.654 | 3.665 | 1.55032 | 75.5 | 4.63 |
| 12 | 123.416 | 1.000 | | | 4.41 |
| 13 | ∞ | 0.400 | 1.51680 | 64.2 | 4.29 |
| 14 | ∞ | 2.434 | | | 4.26 |
| 15 | ∞ | 0.400 | 1.51680 | 64.2 | 3.96 |
| 16 | ∞ | 0.045 | | | 3.93 |

IM(Imaging Surface)
The asterisk (*) designates an aspherical surface which is rotationally symmetrical with respect to the optical axis.

TABLE 22

VARIOUS LENS SYSTEM DATA

| | |
|---|---|
| f | 6.26 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.18
Curvature at, or in the vicinity of, effective aperture of surface on the object side of the negative lens element 11 (i.e., an example curvature at an outermost peripheral portion) [1/mm]: −0.03
Focal length of entire optical system normalized by the image-sensor size: 1.64

TABLE 23

FOCAL LENGTH DATA

| | |
|---|---|
| Focal length of first lens group G1: | −35.594 |
| Focal length of second lens group G2: | 7.882 |
| Focal length of negative lens element 11: | −13.252 |

TABLE 23-continued

FOCAL LENGTH DATA

| | |
|---|---|
| Focal length of positive lens element 12: | 29.576 |
| Focal length of positive lens element 21B: | 14.466 |
| Focal length of negative lens element 22B: | −13.090 |
| Focal length of positive lens element 23B: | 10.228 |
| Focal length of positive lens element 24B: | 16.722 |

TABLE 24

ASPHERICAL SURFACE DATA

| Surf. No. | K | A3 | A4 | A6 |
|---|---|---|---|---|
| 1 | −1.000 | 0.00000E+00 | −3.47741E−04 | −1.38749E−05 |
| 2 | −1.000 | 0.00000E+00 | 2.34139E−04 | −1.57714E−04 |
| 3 | −1.000 | 9.86161E−05 | −8.50683E−04 | −1.57785E−04 |
| 4 | −1.000 | 2.60017E−04 | −6.84008E−04 | −8.48713E−06 |

| Surf. No. | A8 | A10 | A12 | A14 |
|---|---|---|---|---|
| 1 | −1.44077E−06 | 7.07668E−08 | −1.15489E−09 | 6.76641E−12 |
| 2 | −1.79401E−05 | 2.77809E−06 | −1.31636E−07 | 2.61888E−09 |
| 3 | 2.17920E−05 | −2.65296E−06 | 1.86141E−07 | −5.85140E−09 |
| 4 | −2.46909E−08 | −8.37064E−08 | 1.25123E−08 | −5.52069E−10 |

Numerical Embodiment 7

Figure 13:
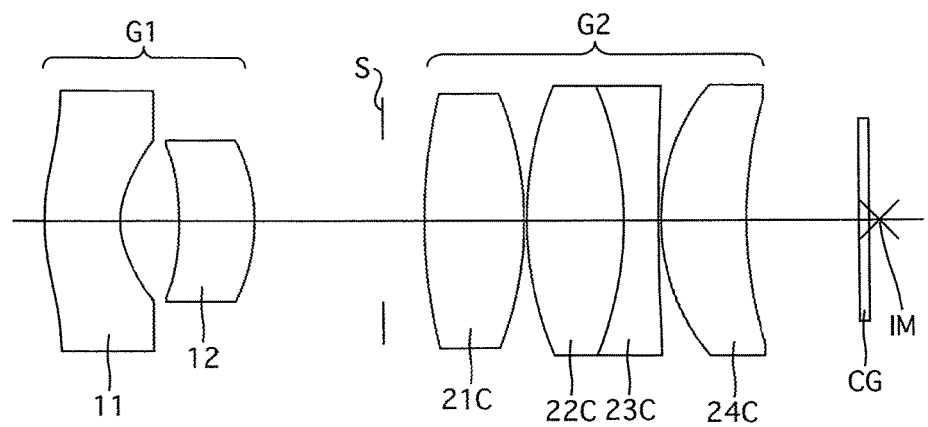
FIG. 13 shows a lens arrangement of a seventh numerical embodiment of an imaging optical system, according to the present invention.
Figures 14A, 14B, 14C, 14D:
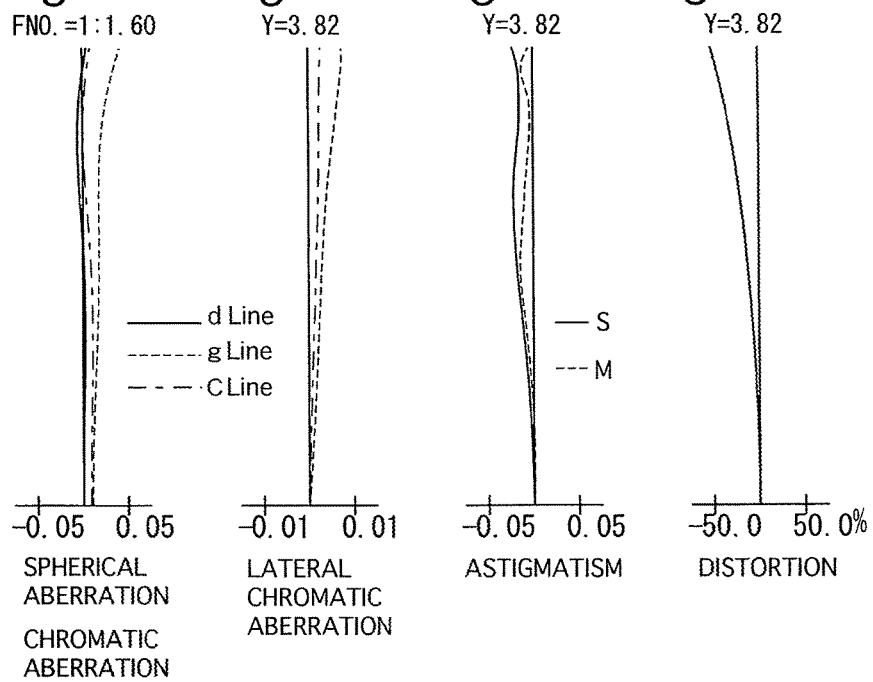
FIGS. 14A, 14B, 14C and 14D show various aberrations that occurred in the lens arrangement of FIG. 13.

FIGS. 13 through 14D and Tables 25 through 28 show a seventh numerical embodiment of the imaging optical system, according to the present invention. FIG. 13 shows a lens arrangement of the imaging optical system. FIGS. 14A, 14B, 14C and 14D show various aberrations that occurred in the zoom lens system of FIG. 13. Table 25 indicates the surface data, Table 26 indicates various lens system data, Table 27 indicates focal length data, and Table 28 indicates aspherical surface data.

The seventh numerical embodiment has the same lens arrangement as that of the first numerical embodiment except for the following features:

(1) The first lens group G1 has a negative refractive power instead of a positive refractive power.

(2) The positive lens element 12 of the first lens group G1 is a positive meniscus lens element, having a convex surface on the image side, that is formed from an aspherical glass molded lens element (having an aspherical surface on each side thereof).

(3) The second lens group G2 is configured of a positive lens element 21C formed from a spherical glass lens element, a positive lens element 22C formed from a spherical glass lens element, a negative lens element 23C formed from a spherical glass lens element, and a positive lens element 24C formed from a spherical glass lens element, in that order from the object side. The positive lens element 21C is a biconvex positive lens element. The positive lens element 22C is a biconvex positive lens element and the negative lens element 230 is a biconcave negative lens element; the positive lens element (biconvex positive lens element) 22C and the negative lens element (biconcave negative lens element) 23C are cemented to each other. The positive lens element 24C is a positive meniscus lens element having a convex surface on the object side.

TABLE 25

SURFACE DATA

| Surf. No. | r | d | N(d) | vd | Effective Aperture |
|---|---|---|---|---|---|
| 1* | 8.050 | 3.000 | 1.80139 | 45.5 | 5.10 |
| 2* | 3.120 | 2.351 | | | 3.15 |
| 3* | −12.575 | 3.000 | 1.82080 | 42.7 | 3.00 |
| 4* | −7.65 | −0.360 | | | 3.17 |
| 5(Diaphragm) | ∞ | 7.206 | | | 3.00 |
| 6 | 21.036 | 4.000 | 1.55032 | 75.5 | 4.41 |
| 7 | −13.181 | 0.100 | | | 5.00 |
| 8 | 13.407 | 3.881 | 1.58913 | 61.3 | 5.30 |
| 9 | −13.407 | 1.400 | 1.92286 | 20.9 | 5.17 |
| 10 | 113.853 | 0.100 | | | 5.20 |
| 11 | 8.194 | 3.413 | 1.55032 | 75.5 | 5.33 |
| 12 | 16.595 | 4.464 | | | 4.80 |
| 13 | ∞ | 0.400 | 1.51680 | 64.2 | 3.99 |
| 14 | ∞ | 0.045 | | | 3.94 |

IM(Imaging Surface)

The asterisk (*) designates an aspherical surface which is rotationally symmetrical with respect to the optical axis.

TABLE 26

VARIOUS LENS SYSTEM DATA

| | |
|---|---|
| f | 6.26 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.12

Curvature at, or in the vicinity of, effective aperture of surface on the object side of the negative lens element 11 (i.e., an example curvature at an outermost peripheral portion) [1/mm]: 0.02

Focal length of entire optical system normalized by the image-sensor size: 1.64

TABLE 27

FOCAL LENGTH DATA

| | |
|---|---|
| Focal length of first lens group G1: | −28.321 |
| Focal length of second lens group G2: | 8.807 |
| Focal length of negative lens element 11: | −8.718 |
| Focal length of positive lens element 12: | 18.671 |
| Focal length of positive lens element 21C: | 15.363 |
| Focal length of positive lens element 22C: | 12.024 |
| Focal length of negative lens element 23C: | −12.929 |
| Focal length of positive lens element 24C: | 25.708 |

TABLE 28

ASPHERICAL SURFACE DATA

| Surf. No. | K | A3 | A4 | A6 |
|---|---|---|---|---|
| 1 | −1.000 | 0.00000E+00 | −1.17811E−03 | −1.17392E−04 |
| 2 | −1.000 | 0.00000E+00 | −7.43680E−04 | −3.38404E−05 |
| 3 | −1.000 | 0.00000E+00 | −1.51525E−03 | −2.24627E−05 |
| 4 | −1.000 | 0.00000E+00 | −2.99872E−03 | −1.10455E−04 |

| Surf. No. | A8 | A10 | A12 | A14 |
|---|---|---|---|---|
| 1 | 9.67332E−07 | 1.33292E−07 | 1.29888E−08 | 0.00000E+00 |
| 2 | −7.41479E−08 | 1.54911E−07 | −8.66691E−09 | 0.00000E+00 |

TABLE 28-continued

ASPHERICAL SURFACE DATA

| | | | | |
|---|---|---|---|---|
| 3 | 3.97479E−07 | 7.16787E−08 | −2.36168E−09 | 2.02749E−11 |
| 4 | 6.99873E−06 | 2.03734E−06 | −3.11172E−07 | 1.84754E−08 |

Numerical Embodiment 8

Figure 15:
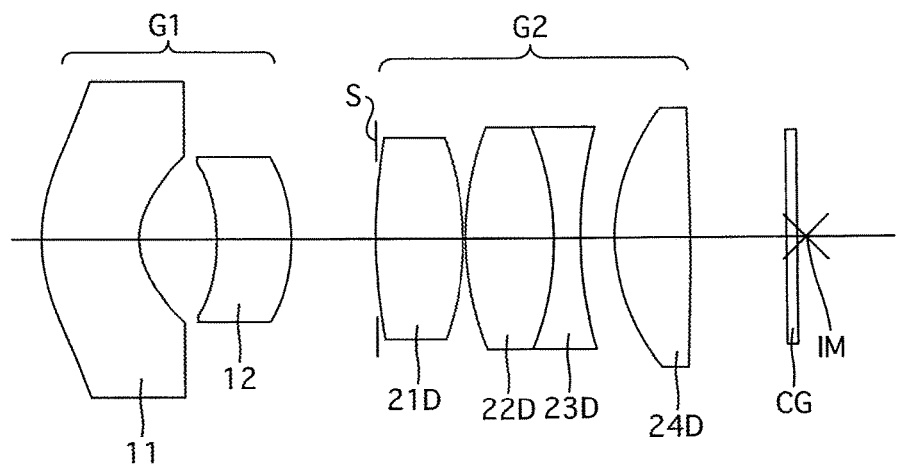
FIG. 15 shows a lens arrangement of an eighth numerical embodiment of an imaging optical system, according to the present invention.
Figures 16A, 16B, 16C, 16D:
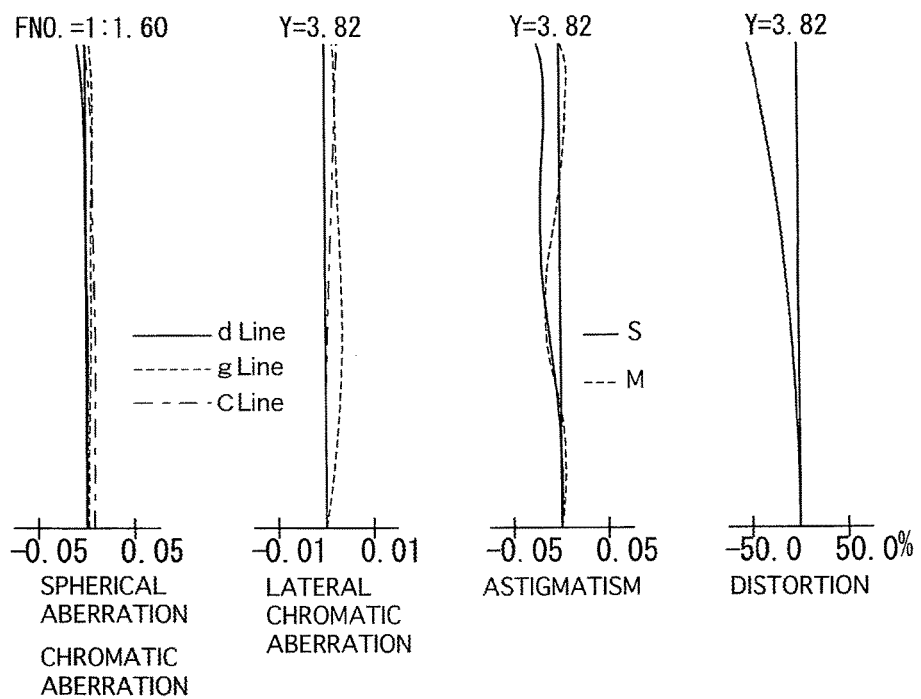
FIGS. 16A, 16B, 16C and 16D show various aberrations that occurred in the lens arrangement of FIG. 15.

FIGS. 15 through 16D and Tables 29 through 32 show an eighth numerical embodiment of the imaging optical system, according to the present invention. FIG. 15 shows a lens arrangement of the imaging optical system. FIGS. 16A, 16B, 16C and 16D show various aberrations that occurred in the zoom lens system of FIG. 15. Table 29 indicates the surface data, Table 30 indicates various lens system data, Table 31 indicates focal length data, and Table 32 indicates aspherical surface data.

The eighth numerical embodiment has the same lens arrangement as that of the first numerical embodiment except for the following features:

(1) The first lens group G1 has a negative refractive power instead of a positive refractive power.

(2) The positive lens element 12 of the first lens group G1 is a positive meniscus lens element, having a convex surface on the image side, that is formed from an aspherical glass molded lens element (having an aspherical surface on each side thereof).

(3) The second lens group G2 is configured of a positive lens element 21D formed from a spherical glass lens element, a positive lens element 22D formed from a spherical glass lens element, a negative lens element 23D formed from a spherical glass lens element, and a positive lens element 24D formed from an aspherical glass molded lens element (having an aspherical surface on each side thereof), in that order from the object side. The positive lens element 21D is a biconvex positive lens element. The positive lens element 22D is a biconvex positive lens element, and the negative lens element 23D is a biconcave negative lens element; the positive lens element (biconvex positive lens element) 22D and the negative lens element (biconcave negative lens element) 23D are cemented to each other. The positive lens element 24D is a biconvex positive lens element.

TABLE 29

SURFACE DATA

| Surf. No. | r | d | N(d) | vd | Effective Aperture |
|---|---|---|---|---|---|
| 1* | 6.259 | 3.700 | 1.80139 | 45.5 | 5.87 |
| 2* | 2.710 | 2.930 | | | 3.10 |
| 3* | −7.403 | 2.822 | 1.85135 | 40.1 | 2.82 |
| 4* | −6.754 | −0.254 | | | 3.07 |
| 5(Diaphragm) | ∞ | 3.474 | | | 2.85 |
| 6 | 20.346 | 3.422 | 1.55032 | 75.5 | 3.03 |
| 7 | −10.46 | 0.100 | | | 3.75 |
| 8 | 10.851 | 3.357 | 1.65844 | 50.9 | 4.13 |
| 9 | −10.851 | 1.000 | 1.84666 | 23.8 | 4.07 |
| 10 | 14.583 | 1.285 | | | 4.10 |
| 11 | 7.063 | 2.861 | 1.55332 | 71.7 | 4.83 |
| 12* | −83.869 | 3.658 | | | 4.71 |
| 13* | ∞ | 0.400 | 1.51680 | 64.2 | 3.98 |
| 14 | ∞ | 0.045 | | | 3.93 |

IM(Imaging Surface)
The asterisk (*) designates an aspherical surface which is rotationally symmetrical with respect to the optical axis.

TABLE 30

VARIOUS LENS SYSTEM DATA

| | |
|---|---|
| f | 6.26 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.16
Curvature at, or in the vicinity of, effective aperture of surface on the object side of the negative lens element 11 (i.e., an example curvature at an outermost peripheral portion) [1/mm]: −1.09
Focal length of entire optical system normalized by the image-sensor size: 1.64

TABLE 31

FOCAL LENGTH DATA

| | |
|---|---|
| Focal length of first lens group G1: | −25.345 |
| Focal length of second lens group G2: | 7.895 |
| Focal length of negative lens element 11: | −11.123 |
| Focal length of positive lens element 12: | 30.158 |
| Focal length of positive lens element 21D: | 13.068 |
| Focal length of positive lens element 22D: | 8.779 |
| Focal length of negative lens element 23D: | −7.218 |
| Focal length of positive lens element 24D: | 11.907 |

TABLE 32

ASPHERICAL SURFACE DATA

| Surf. No. | K | A3 | A4 | A6 |
|---|---|---|---|---|
| 1 | −1.000 | 0.00000E+00 | −3.79799E−04 | −1.13353E−05 |
| 2 | −1.000 | 0.00000E+00 | 8.03159E−05 | −2.27561E−04 |
| 3 | −1.000 | 0.00000E+00 | −1.65137E−03 | −1.82980E−04 |
| 4 | −1.000 | 0.00000E+00 | −8.54271E−04 | −4.96999E−05 |
| 12 | 0.000 | 0.00000E+00 | −2.44234E−04 | 1.78643E−06 |
| 13 | 0.000 | 0.00000E+00 | −1.55469E−04 | 2.18036E−05 |

| Surf. No. | A8 | A10 | A12 | A14 |
|---|---|---|---|---|
| 1 | −8.89522E−07 | 4.73436E−08 | −7.30848E−10 | 3.84216E−12 |
| 2 | 3.04046E−05 | −3.87017E−06 | 3.30234E−07 | −8.34750E−09 |
| 3 | 2.24647E−05 | −2.69113E−06 | 8.72112E−08 | 0.00000E+00 |
| 4 | 6.34259E−06 | −6.66119E−07 | 2.46417E−08 | 0.00000E+00 |
| 12 | −9.03745E−08 | −8.31728E−10 | 0.00000E+00 | 0.00000E+00 |
| 13 | −6.95018E−07 | 7.84930E−09 | 0.00000E+00 | 0.00000E+00 |

Numerical Embodiment 9

Figure 17:
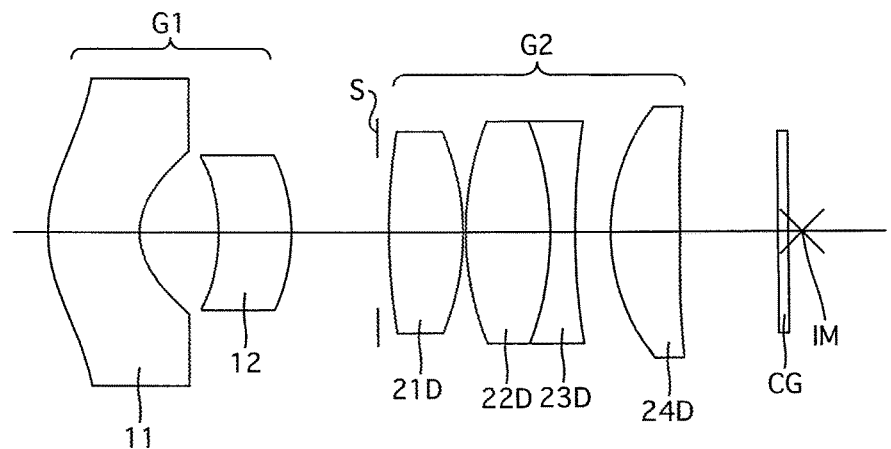
FIG. 17 shows a lens arrangement of a ninth numerical embodiment of an imaging optical system, according to the present invention.
Figures 18A, 18B, 18C, 18D:
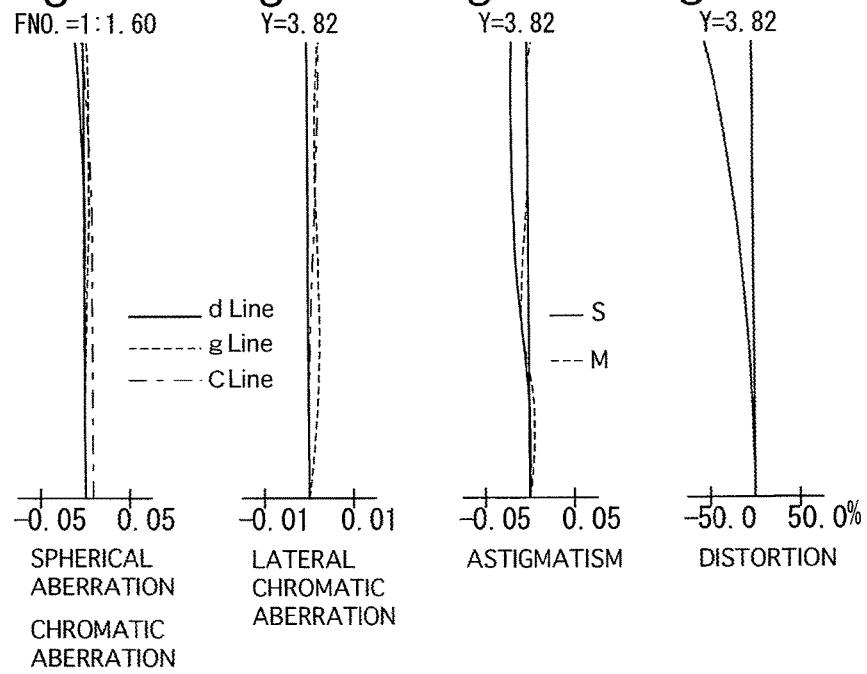
FIGS. 18A, 18B, 18C and 18D show various aberrations that occurred in the lens arrangement of FIG. 17.

FIGS. 17 through 18D and Tables 33 through 36 show a ninth numerical embodiment of the imaging optical system, according to the present invention. FIG. 17 shows a lens arrangement of the imaging optical system. FIGS. 18A, 18B, 18C and 18D show various aberrations that occurred in the zoom lens system of FIG. 17. Table 33 indicates the surface data, Table 34 indicates various lens system data, Table 35 indicates focal length data, and Table 36 indicates aspherical surface data.

The ninth numerical embodiment has the same lens arrangement as that of the eighth numerical embodiment except for the following feature:

(1) The positive lens element 24D of the second lens group G2 is a positive meniscus lens element having a convex surface on the object side.

TABLE 33

SURFACE DATA

| Surf. No. | r | d | N(d) | vd | Effective Aperture |
|---|---|---|---|---|---|
| 1* | 5.725 | 3.700 | 1.58313 | 59.5 | 6.07 |
| 2* | 2.401 | 3.170 | | | 3.21 |
| 3* | -8.306 | 2.960 | 1.82080 | 42.7 | 2.94 |
| 4* | -7.524 | -0.510 | | | 3.06 |
| 5(Diaphragm) | ∞ | 4.510 | | | 2.99 |
| 6 | 24.34 | 3.050 | 1.55032 | 75.5 | 3.40 |
| 7 | -10.063 | 0.100 | | | 3.97 |
| 8 | 11.469 | 3.450 | 1.58913 | 61.3 | 4.35 |
| 9 | -11.469 | 1.000 | 1.84666 | 23.8 | 4.31 |
| 10 | 27.671 | 1.420 | | | 4.38 |
| 11 | 7.931 | 2.770 | 1.55332 | 71.7 | 4.95 |
| 12* | 765 | 3.935 | | | 4.77 |
| 13* | ∞ | 0.400 | 1.51680 | 64.2 | 3.98 |
| 14 | ∞ | 0.045 | | | 3.93 |

IM(Imaging Surface)

The asterisk (*) designates an aspherical surface which is rotationally symmetrical with respect to the optical axis.

TABLE 34

VARIOUS LENS SYSTEM DATA

| | |
|---|---|
| f | 6.28 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.17

Curvature at, or in the vicinity of, effective aperture of surface on the object side of the negative lens element 11 (i.e., an example curvature at an outermost peripheral portion) [1/mm]: -0.05

Focal length of entire optical system normalized by the image-sensor size: 1.64

TABLE 35

FOCAL LENGTH DATA

| | |
|---|---|
| Focal length of first lens group G1: | -25.042 |
| Focal length of second lens group G2: | 8.092 |
| Focal length of negative lens element 11: | -12.020 |
| Focal length of positive lens element 12: | 35.977 |
| Focal length of positive lens element 21D: | 13.357 |
| Focal length of positive lens element 22D: | 10.309 |
| Focal length of negative lens element 23D: | -9.466 |
| Focal length of positive lens element 24D: | 14.465 |

TABLE 36

ASPHERICAL SURFACE DATA

| Surf. No. | K | A3 | A4 | A6 |
|---|---|---|---|---|
| 1 | -1.000 | 0.00000E+00 | -5.87800E-04 | -2.19240E-05 |
| 2 | -1.000 | 0.00000E+00 | -1.84270E-05 | -4.00680E-04 |
| 3 | -1.000 | 0.00000E+00 | -1.30600E-03 | -9.40530E-05 |
| 4 | -1.000 | 0.00000E+00 | -6.83630E-04 | -6.90430E-06 |
| 12 | 0.000 | 0.00000E+00 | -6.40600E-05 | 6.29090E-06 |
| 13 | 0.000 | 0.00000E+00 | -4.54950E-05 | 2.68090E-05 |

TABLE 36-continued

ASPHERICAL SURFACE DATA

| Surf. No. | A8 | A10 | A12 | A14 |
|---|---|---|---|---|
| 1 | -1.01330E-06 | 7.93010E-08 | -1.66940E-09 | 1.22390E-11 |
| 2 | 6.37420E-05 | -9.10110E-06 | 8.30070E-07 | -2.94460E-08 |
| 3 | 7.16250E-06 | -4.58590E-07 | -6.16250E-09 | 0.00000E+00 |
| 4 | -1.68400E-06 | 2.60850E-07 | -1.31260E-08 | 0.00000E+00 |
| 12 | -8.97570E-08 | -1.06430E-09 | 0.00000E+00 | 0.00000E+00 |
| 13 | -8.46770E-07 | 6.24780E-09 | 0.00000E+00 | 0.00000E+00 |

Numerical Embodiment 10

FIGS. 19 through 20D and Tables 37 through 40 show a tenth numerical embodiment of the imaging optical system, according to the present invention. FIG. 19 shows a lens arrangement of the imaging optical system. FIGS. 20A, 20B, 20C and 20D show various aberrations that occurred in the zoom lens system of FIG. 19. Table 37 indicates the surface data, Table 38 indicates various lens system data, Table 39 indicates focal length data, and Table 40 indicates aspherical surface data.

The tenth numerical embodiment has the same lens arrangement as that of the eighth numerical embodiment.

TABLE 37

SURFACE DATA

| Surf. No. | r | d | N(d) | vd | Effective Aperture |
|---|---|---|---|---|---|
| 1* | 5.563 | 2.893 | 1.58913 | 61.3 | 5.53 |
| 2* | 2.756 | 3.376 | | | 3.22 |
| 3* | -6.672 | 2.247 | 1.85135 | 40.1 | 2.52 |
| 4* | -6.399 | -0.434 | | | 2.53 |
| 5(Diaphragm) | ∞ | 3.102 | | | 2.48 |
| 6 | 62.161 | 3.123 | 1.59282 | 68.6 | 3.46 |
| 7 | -8.555 | 0.100 | | | 4.06 |
| 8 | 12.136 | 3.189 | 1.83481 | 42.7 | 4.40 |
| 9 | -15.408 | 0.800 | 1.94595 | 18.0 | 4.30 |
| 10 | 20.604 | 0.409 | | | 4.24 |
| 11 | 14.263 | 4.115 | 1.55332 | 71.7 | 4.32 |
| 12* | -135.674 | 3.055 | | | 4.26 |
| 13* | ∞ | 0.400 | 1.51680 | 64.2 | 3.95 |
| 14 | ∞ | 0.045 | | | 3.93 |

IM(Imaging Surface)

The asterisk (*) designates an aspherical surface which is rotationally symmetrical with respect to the optical axis.

TABLE 38

VARIOUS LENS SYSTEM DATA

| | |
|---|---|
| f | 6.27 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.18

Curvature at, or in the vicinity of, effective aperture of surface on the object side of the negative lens element 11 (i.e., an example curvature at an outermost peripheral portion) [1/mm]: 0.03

Focal length of entire optical system normalized by the image-sensor size: 1.64

TABLE 39

FOCAL LENGTH DATA

| | |
|---|---|
| Focal length of first lens group G1: | −34.478 |
| Focal length of second lens group G2: | 7.466 |
| Focal length of negative lens element 11: | −15.002 |
| Focal length of positive lens element 12: | 38.389 |
| Focal length of positive lens element 21D: | 12.897 |
| Focal length of positive lens element 22D: | 8.584 |
| Focal length of negative lens element 23D: | −9.220 |
| Focal length of positive lens element 24D: | 23.555 |

TABLE 40

ASPHERICAL SURFACE DATA

| Surf. No. | K | A3 | A4 | A6 |
|---|---|---|---|---|
| 1 | −1.000 | −2.89349E−04 | −8.99891E−04 | −5.60232E−05 |
| 2 | −1.000 | 0.00000E+00 | −2.00874E−03 | −8.11287E−05 |
| 3 | −1.000 | 0.00000E+00 | −2.28195E−03 | 7.94055E−05 |
| 4 | −1.000 | 0.00000E+00 | −9.54252E−04 | 2.96517E−05 |
| 12 | 0.000 | 0.00000E+00 | −2.53188E−04 | 2.31737E−05 |
| 13 | 0.000 | 0.00000E+00 | −1.62301E−03 | 1.05056E−04 |

| Surf. No. | A8 | A10 | A12 | A14 |
|---|---|---|---|---|
| 1 | 4.18669E−07 | 1.19427E−07 | −4.20148E−09 | 4.38636E−11 |
| 2 | −3.54775E−05 | 9.91674E−06 | −8.21335E−07 | 2.57290E−08 |
| 3 | −3.97875E−05 | 7.22797E−06 | −4.44000E−07 | 0.00000E+00 |
| 4 | −6.27985E−06 | 7.83979E−07 | −3.51431E−08 | 0.00000E+00 |
| 12 | −1.48152E−06 | 4.24313E−08 | −3.95478E−10 | 0.00000E+00 |
| 13 | −2.80912E−06 | −1.56731E−08 | 1.82684E−09 | 0.00000E+00 |

Numerical Embodiment 11

FIGS. 21 through 22D and Tables 41 through 44 show a eleventh numerical embodiment of the imaging optical system, according to the present invention. FIG. 21 shows a lens arrangement of the imaging optical system. FIGS. 22A, 22B, 22C and 22D show various aberrations that occurred in the zoom lens system of FIG. 21. Table 41 indicates the surface data, Table 42 indicates various lens system data, Table 43 indicates focal length data, and Table 44 indicates aspherical surface data.

The eleventh numerical embodiment has the same lens arrangement as that of the eighth numerical embodiment except for the following feature:

(1) The biconvex positive lens element 21D of the second lens group G2 is formed from an aspherical glass molded lens element (having an aspherical surface on each side thereof).

TABLE 41

SURFACE DATA

| Surf. No. | r | d | N(d) | vd | Effective Aperture |
|---|---|---|---|---|---|
| 1* | 5.518 | 3.251 | 1.55332 | 71.7 | 5.70 |
| 2* | 2.493 | 3.376 | | | 3.11 |
| 3* | −6.802 | 1.864 | 1.77377 | 47.2 | 2.54 |
| 4* | −6.11 | −0.418 | | | 2.56 |
| 5(Diaphragm) | ∞ | 2.806 | | | 2.48 |
| 6 | 106.266 | 3.965 | 1.55332 | 71.7 | 3.19 |
| 7* | −6.707 | 0.100 | | | 4.04 |
| 8* | 11.768 | 3.180 | 1.72916 | 54.7 | 4.40 |
| 9 | −16.455 | 1.000 | 1.92286 | 20.9 | 4.32 |
| 10 | 20.581 | 0.382 | | | 4.29 |
| 11 | 14.381 | 3.494 | 1.55332 | 71.7 | 4.40 |
| 12* | −88.174 | 3.555 | | | 4.39 |
| 13* | ∞ | 0.400 | 1.51680 | 64.2 | 3.96 |
| 14 | ∞ | 0.045 | | | 3.93 |

IM(Imaging Surface)
The asterisk (*) designates an aspherical surface which is rotationally symmetrical with respect to the optical axis.

TABLE 42

VARIOUS LENS SYSTEM DATA

| | |
|---|---|
| f | 6.38 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.18
Curvature at, or in the vicinity of, effective aperture of surface on the object side of the negative lens element 11 (i.e., an example curvature at an outermost peripheral portion) [1/mm]: −0.26
Focal length of entire optical system normalized by the image-sensor size: 1.67

TABLE 43

FOCAL LENGTH DATA

| | |
|---|---|
| Focal length of first lens group G1: | −27.904 |
| Focal length of second lens group G2: | 7.404 |
| Focal length of negative lens element 11: | −13.321 |
| Focal length of positive lens element 12: | 35.686 |
| Focal length of positive lens element 21D: | 11.547 |
| Focal length of positive lens element 22D: | 9.879 |
| Focal length of negative lens element 23D: | −9.782 |
| Focal length of positive lens element 24D: | 22.620 |

TABLE 44

ASPHERICAL SURFACE DATA

| Surf. No. | K | A3 | A4 | A6 |
|---|---|---|---|---|
| 1 | −1.000 | −4.80105E−04 | −6.52202E−04 | −6.82464E−05 |
| 2 | −1.000 | 0.00000E+00 | −1.10134E−03 | −8.64999E−05 |
| 3 | −1.000 | 0.00000E+00 | −1.80327E−03 | −1.73512E−04 |
| 4 | −1.000 | 0.00000E+00 | −9.40848E−04 | −2.99926E−05 |
| 7 | 0.000 | 0.00000E+00 | −8.63069E−05 | 4.02963E−06 |
| 8 | 0.000 | 0.00000E+00 | 1.64014E−04 | 9.45447E−06 |
| 12 | 0.000 | 0.00000E+00 | −3.14502E−04 | 3.55676E−05 |
| 13 | 0.000 | 0.00000E+00 | −2.04304E−03 | 1.27658E−04 |

| Surf. No. | A8 | A10 | A12 | A14 |
|---|---|---|---|---|
| 1 | 1.23824E−06 | 6.69905E−08 | −2.72200E−09 | 2.88840E−11 |
| 2 | −4.73374E−05 | 1.27235E−05 | −9.80526E−07 | 2.37229E−08 |
| 3 | 3.19188E−05 | −4.65007E−06 | 1.76472E−07 | 0.00000E+00 |
| 4 | −8.61362E−07 | 1.07511E−07 | −1.75149E−08 | 0.00000E+00 |
| 7 | −1.69777E−06 | 2.36113E−08 | 0.00000E+00 | 0.00000E+00 |
| 8 | −4.11245E−07 | −7.57629E−09 | 0.00000E+00 | 0.00000E+00 |
| 12 | −1.59155E−06 | 2.40321E−08 | 0.00000E+00 | 0.00000E+00 |
| 13 | −4.14327E−06 | 5.64850E−08 | 0.00000E+00 | 0.00000E+00 |

Numerical Embodiment 12

Figure 23:
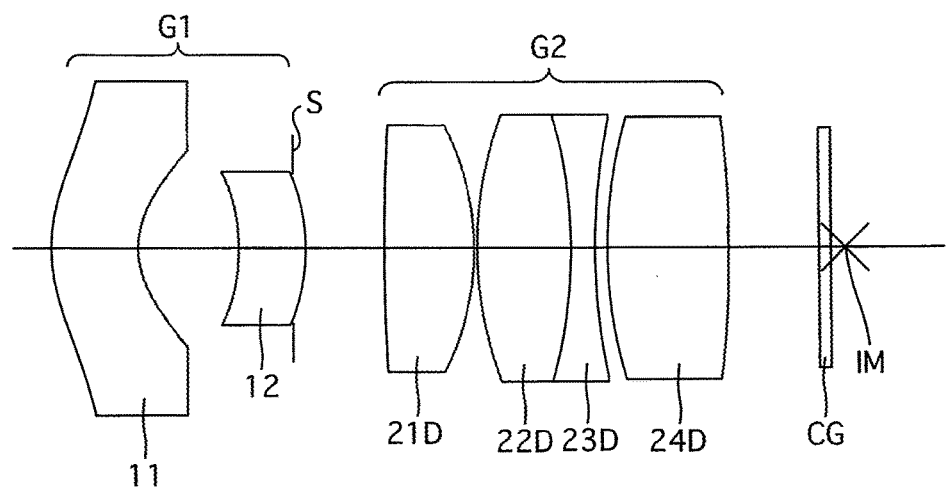
FIG. 23 shows a lens arrangement of a twelfth numerical embodiment of an imaging optical system, according to the present invention.
Figures 24A, 24B, 24C, 24D:
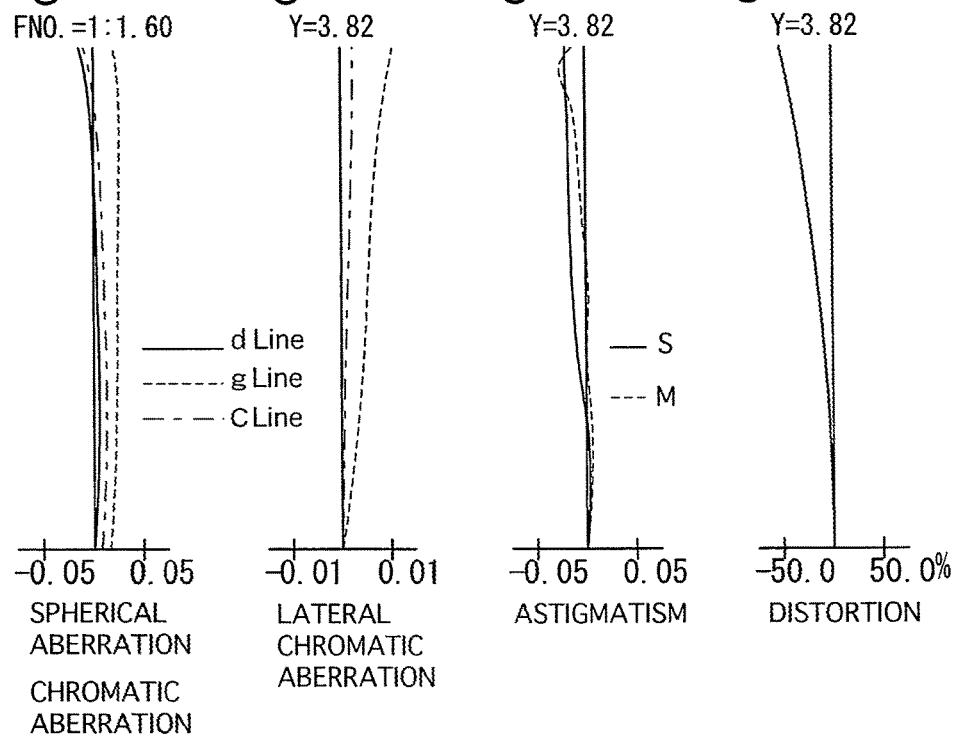
FIGS. 24A, 24B, 24C and 24D show various aberrations that occurred in the lens arrangement of FIG. 23.

FIGS. 23 through 24D and Tables 45 through 48 show a twelfth numerical embodiment of the imaging optical system, according to the present invention. FIG. 23 shows a lens arrangement of the imaging optical system. FIGS. 24A, 24B, 24C and 24D show various aberrations that occurred in the zoom lens system of FIG. 23. Table 45 indicates the surface data, Table 46 indicates various lens system data, Table 47 indicates focal length data, and Table 48 indicates aspherical surface data.

The twelfth numerical embodiment has the same lens arrangement as that of the ninth numerical embodiment.

TABLE 45

SURFACE DATA

| Surf. No. | r | d | N(d) | vd | Effective Aperture |
|---|---|---|---|---|---|
| 1* | 5.500 | 3.537 | 1.58313 | 59.5 | 5.74 |
| 2* | 2.572 | 2.917 | | | 3.12 |
| 3* | −7.351 | 2.821 | 1.55332 | 71.7 | 2.77 |
| 4* | −6.5 | −0.419 | | | 2.52 |
| 5(Diaphragm) | ∞ | 3.199 | | | 2.48 |
| 6 | 20.209 | 3.397 | 1.59282 | 68.6 | 3.93 |
| 7 | −9.695 | 0.100 | | | 4.31 |
| 8 | 10.378 | 3.815 | 1.59282 | 68.6 | 4.40 |
| 9 | −10.378 | 1.000 | 1.92286 | 20.9 | 4.28 |
| 10 | 587.159 | 0.349 | | | 4.33 |
| 11 | 16.685 | 2.200 | 1.55332 | 71.7 | 4.38 |
| 12* | 224.469 | 3.639 | | | 4.25 |
| 13* | ∞ | 0.400 | 1.51680 | 64.2 | 3.95 |
| 14 | ∞ | 0.045 | | | 3.93 |

IM(Imaging Surface)
The asterisk (*) designates an aspherical surface which is rotationally symmetrical with respect to the optical axis.

TABLE 46

VARIOUS LENS SYSTEM DATA

| | |
|---|---|
| f | 6.61 |
| FNO. | 1.60 |
| W | 50 |
| Y | 3.82 |

Curvature at central portion on surface on object side of negative lens element 11 (paraxial curvature/curvature of paraxial convex surface) [1/mm]: 0.18

Curvature at, or in the vicinity of, effective aperture of surface on the object side of the negative lens element 11 (i.e., an example curvature at an outermost peripheral portion) [1/mm]: −0.07

Focal length of entire optical system normalized by the image-sensor size: 1.73

TABLE 47

FOCAL LENGTH DATA

| | |
|---|---|
| Focal length of first lens group G1: | −27.745 |
| Focal length of second lens group G2: | 7.381 |
| Focal length of negative lens element 11: | −14.924 |
| Focal length of positive lens element 12: | 46.524 |
| Focal length of positive lens element 21D: | 11.540 |
| Focal length of positive lens element 22D: | 9.395 |
| Focal length of negative lens element 23D: | −9.220 |
| Focal length of positive lens element 24D: | 32.453 |

TABLE 48

ASPHERICAL SURFACE DATA

| Surf. No. | K | A3 | A4 | A6 |
|---|---|---|---|---|
| 1 | −1.000 | −1.93345E−04 | −6.60222E−04 | −3.25902E−05 |
| 2 | −1.000 | 0.00000E+00 | −2.24645E−03 | 9.65534E−05 |
| 3 | −1.000 | 0.00000E+00 | −2.20620E−03 | −6.27326E−06 |
| 4 | −1.000 | 0.00000E+00 | −9.71837E−04 | 1.18419E−04 |
| 12 | 0.000 | 0.00000E+00 | −5.74002E−04 | 6.78388E−05 |
| 13 | 0.000 | 0.00000E+00 | −1.60217E−03 | 1.30989E−04 |

| Surf. No. | A8 | A10 | A12 | A14 |
|---|---|---|---|---|
| 1 | −1.38790E−06 | 1.30847E−07 | −3.00640E−09 | 2.31405E−11 |
| 2 | −8.11262E−05 | 1.33573E−05 | −8.61099E−07 | 2.38868E−08 |
| 3 | 4.17157E−07 | 5.80187E−07 | −4.65725E−08 | 0.00000E+00 |
| 4 | −3.10838E−05 | 4.44148E−06 | −2.37080E−07 | 0.00000E+00 |
| 12 | −2.25051E−06 | −1.01473E−08 | 1.55364E−09 | 0.00000E+00 |
| 13 | −1.66970E−06 | −1.74956E−07 | 6.00202E−09 | 0.00000E+00 |

Numerical Embodiment 13

FIGS. 25 through 26D and Tables 49 through 52 show a thirteenth numerical embodiment of the imaging optical system, according to the present invention. FIG. 25 shows a lens arrangement of the imaging optical system. FIGS. 26A, 26B, 26C and 26D show various aberrations that occurred in the zoom lens system of FIG. 25. Table 49 indicates the surface data, Table 50 indicates various lens system data, Table 51 indicates focal length data, and Table 52 indicates aspherical surface data.

The thirteenth numerical embodiment has the same lens arrangement as that of the ninth numerical embodiment except for the following feature:

(1) The negative lens element 23D of the second lens group G2 is a negative meniscus lens element having a convex surface on the image side.

TABLE 49

SURFACE DATA

| Surf. No. | r | d | N(d) | vd | Effective Aperture |
|---|---|---|---|---|---|
| 1* | 4.700 | 3.200 | 1.58313 | 59.5 | 5.26 |
| 2* | 2.239 | 2.709 | | | 2.76 |
| 3* | −6.726 | 1.850 | 1.82080 | 42.7 | 2.37 |
| 4* | −6.702 | −0.304 | | | 2.32 |
| 5(Diaphragm) | ∞ | 2.427 | | | 2.26 |
| 6 | 20.061 | 3.286 | 1.55032 | 75.5 | 3.39 |
| 7 | −8.185 | 0.100 | | | 3.93 |
| 8 | 9.794 | 3.852 | 1.65844 | 50.9 | 4.20 |
| 9 | −9.794 | 0.700 | 1.94595 | 18.0 | 4.11 |
| 10 | −855.909 | 0.359 | | | 4.16 |
| 11 | 13.728 | 1.743 | 1.55332 | 71.7 | 4.21 |
| 12* | 61.506 | 3.633 | | | 4.17 |
| 13* | ∞ | 0.400 | 1.51680 | 64.2 | 3.94 |
| 14 | ∞ | 0.045 | | | 3.92 |

IM(Imaging Surface)
The asterisk (*) designates an aspherical surface which is rotationally symmetrical with respect to the optical axis.

TABLE 50

VARIOUS LENS SYSTEM DATA

| | |
|---|---|
| f | 6.38 |
| FNO. | 1.60 |

TABLE 50-continued

VARIOUS LENS SYSTEM DATA

| W | 50 |
|---|---|
| Y | 3.82 |

Curvature at central portion on surface on object side of negative lens element 11 (paraxial curvature/curvature of paraxial convex surface) [1/mm]: 0.21
Curvature at, or in the vicinity of, effective aperture of surface on the object side of the negative lens element 11 (i.e., an example curvature at an outermost peripheral portion) [1/mm]: 0.00
Focal length of entire optical system normalized by the image-sensor size: 1.67

TABLE 51

FOCAL LENGTH DATA

| Focal length of first lens group G1: | −21.042 |
|---|---|
| Focal length of second lens group G2: | 6.507 |
| Focal length of negative lens element 11: | −14.065 |
| Focal length of positive lens element 12: | 63.958 |
| Focal length of positive lens element 21D: | 11.018 |
| Focal length of positive lens element 22D: | 8.067 |
| Focal length of negative lens element 23D: | −10.478 |
| Focal length of positive lens element 24D: | 31.530 |

TABLE 52

ASPHERICAL SURFACE DATA

| Surf. No. | K | A3 | A4 | A6 |
|---|---|---|---|---|
| 1 | −1.000 | −2.75814E−04 | −4.78259E−04 | −1.73307E−05 |
| 2 | −1.000 | 0.00000E+00 | −1.45649E−03 | 1.00529E−03 |
| 3 | −1.000 | 0.00000E+00 | −3.04409E−03 | 2.82701E−04 |
| 4 | −1.000 | 0.00000E+00 | −1.69283E−03 | 2.58587E−04 |
| 12 | 0.000 | 0.00000E+00 | −1.15075E−03 | 1.08111E−04 |
| 13 | 0.000 | 0.00000E+00 | −2.19775E−03 | 2.12333E−04 |

| Surf. No. | A8 | A10 | A12 | A14 |
|---|---|---|---|---|
| 1 | −5.70212E−06 | 4.02511E−07 | −1.01861E−08 | 9.41926E−11 |
| 2 | −5.02109E−04 | 9.37772E−05 | −7.33965E−06 | 2.03370E−07 |
| 3 | −1.20934E−04 | 2.02118E−05 | −1.31318E−06 | 0.00000E+00 |
| 4 | −9.22176E−05 | 1.50890E−05 | −9.29631E−07 | 0.00000E+00 |
| 12 | −5.85477E−06 | 1.12073E−07 | 0.00000E+00 | 0.00000E+00 |
| 13 | −9.74758E−06 | 1.73312E−07 | 0.00000E+00 | 0.00000E+00 |

The numerical values of each condition for each embodiment are shown in Table 53.

TABLE 53

| | Embod. 1 | Embod. 2 | Embod. 3 | Embod. 4 |
|---|---|---|---|---|
| Condition(1) | 1.11 | 1.26 | 1.21 | 1.25 |
| Condition(2) | 0.79 | 0.66 | 0.65 | 0.65 |
| Condition(3) | −1.43 | −1.76 | −1.77 | −1.66 |
| Condition(4) | 75.5 | 75.5 | 75.5 | 75.5 |
| Condition(5) | −0.06 | 0.11 | 0.02 | 0.31 |
| Condition(6) | 0.52 | 0.47 | 0.46 | 0.48 |

| | Embod. 5 | Embod. 6 | Embod. 7 | Embod. 8 | Embod. 9 |
|---|---|---|---|---|---|
| Condition(1) | 1.32 | 0.90 | 1.29 | 1.00 | 0.91 |
| Condition(2) | 0.65 | 0.62 | 0.48 | 0.59 | 0.59 |
| Condition(3) | −1.89 | −2.12 | −1.39 | −1.78 | −1.91 |
| Condition(4) | 75.5 | 75.5 | 75.5 | 75.5 | 75.5 |

TABLE 53-continued

| | | | | | |
|---|---|---|---|---|---|
| Condition(5) | −0.41 | 0.37 | 0.31 | 0.44 | 0.48 |
| Condition(6) | 0.46 | 0.40 | 0.44 | 0.40 | 0.41 |

| | Embod. 10 | Embod. 11 | Embod. 12 | Embod. 13 |
|---|---|---|---|---|
| Condition(1) | 0.89 | 0.87 | 0.83 | 0.74 |
| Condition(2) | 0.46 | 0.51 | 0.53 | 0.50 |
| Condition(3) | −2.39 | −2.09 | −2.26 | −2.20 |
| Condition(4) | 68.6 | 71.7 | 68.6 | 75.5 |
| Condition(5) | 0.44 | 0.48 | 0.54 | 0.67 |
| Condition(6) | 0.34 | 0.38 | 0.36 | 0.35 |

As can be understood from Table 53, the first through thirteenth numerical embodiments satisfy conditions (1) through (6). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging optical system comprising a positive or negative first lens group, an aperture diaphragm, and a positive second lens group, in that order from the object side,
   wherein said first lens group includes a negative lens element provided closest to the object side within said first lens group,
   wherein the negative lens element that is closest to the object side includes an aspherical surface on the object side thereof, said aspherical surface including a paraxial convex surface convexing toward the object side, a paraxial curvature that is the greatest within the effective aperture, and a portion within the effective aperture that has a curvature that is less than ½ of the paraxial curvature, and
   wherein the following conditions (1), (2), (3) and (6) are satisfied:

$$R1/f < 1.35 \quad (1),$$

$$D1/f > 0.4 \quad (2),$$

$$-2.5 < f1/f < -1.3 \quad (3),$$

and $$0.3 < (R1 - R2)/(R1 + R2) < 0.55 \quad (6),$$

wherein
   f designates the focal length of said imaging optical system,
   f1 designates the focal length of the negative lens element provided closest to the object side within said first lens group,
   D1 designates a thickness, along the optical axis, of said negative lens element provided closest to the object side within said first lens group,
   R1 designates the paraxial radius of curvature of the surface on the object side of said negative lens element provided closest to the object side within said first lens group, and
   R2 designates the paraxial radius of curvature of the surface on the image side of said negative lens element provided closest to the object side within said first lens group.

2. The imaging optical system according to claim 1, wherein the following condition (5) is satisfied:

$$-0.45 < f1/fg1 < 1 \quad (5),$$

wherein
 f1 designates the focal length of said negative lens element provided closest to the object side within said first lens group, and
 fg1 designates the focal length of said first lens group.

3. The imaging optical system according to claim 1, wherein said first lens group includes a positive lens element behind said negative lens element provided closest to the object side within said first lens group.

4. The imaging optical system according to claim 3, wherein said positive lens element that is provided behind said negative lens element provided closest to the object side, within said first lens group, is a positive meniscus lens element having a convex surface on the image side.

5. The imaging optical system according to claim 3, wherein said positive lens element that is provided behind said negative lens element provided closest to the object side, within said first lens group, has an Abbe number of at least 35 with respect to the d-line.

6. The imaging optical system according to claim 1, wherein said second lens group includes at least one positive lens element that has an Abbe number of at least 70 with respect to the d-line.

7. The imaging optical system according to claim 1, wherein said second lens group includes at least one negative lens element that has an Abbe number of 20 or less with respect to the d-line.

8. An imaging optical system comprising a positive or negative first lens group, an aperture diaphragm, and a positive second lens group, in that order from the object side,
 wherein said first lens group includes a negative lens element provided closest to the object side within said first lens group,
 wherein the negative lens element that is closest to the object side includes an aspherical surface on the object side thereof, said aspherical surface including a paraxial convex surface convexing toward the object side, a paraxial curvature that is the greatest within the effective aperture, and a portion within the effective aperture that has a curvature that is less than ½ of the paraxial curvature, wherein said first lens group includes a positive lens element behind said negative lens element provided closest to the object side within said first lens group,
 wherein the object side surface of said positive lens element has a negative refractive power, and
 wherein the following conditions (1), (2) and (3) are satisfied:

$$R1/f < 1.35 \quad (1),$$

$$D1/f > 0.4 \quad (2),$$

and $$-2.5 < f1/f < -1.3 \quad (3),$$

wherein
 f designates the focal length of said imaging optical system,
 f1 designates the focal length of the negative lens element provided closest to the object side within said first lens group,
 R1 designates a paraxial radius of curvature of a surface on the object side of said negative lens element provided closest to the object side within said first lens group,
 D1 designates a thickness, along the optical axis, of said negative lens element provided closest to the object side within said first lens group.

9. The imaging optical system according to claim 8, wherein said positive lens element is a positive meniscus lens element having a convex surface on the image side.

10. An imaging optical system comprising a positive or negative first lens group, an aperture diaphragm, and a positive second lens group, in that order from the object side,
 wherein said first lens group includes a negative lens element provided closest to the object side within said first lens group,
 wherein the negative lens element that is closest to the object side includes an aspherical surface on the object side thereof, said aspherical surface including a paraxial convex surface convexing toward the object side, a paraxial curvature that is the greatest within the effective aperture, and a portion within the effective aperture that has a curvature that is less than ½ of the paraxial curvature,
 Wherein said positive second lens group includes a cemented lens comprising a negative lens element and a positive lens element that are cemented to each other, and
 wherein the following conditions (1), (2) and (3) are satisfied:

$$R1/f < 1.35 \quad (1),$$

$$D1/f > 0.4 \quad (2),$$

and $$-2.5 < f1/f < -1.3 \quad (3),$$

and
wherein
 f designates the focal length of said imaging optical system,
 f1 designates the focal length of the negative lens element provided closest to the object side within said first lens group,
 R1 designates a paraxial radius of curvature of a surface on the object side of said negative lens element provided closest to the object side within said first lens group, and
 D1 designates a thickness, along the optical axis, of said negative lens element provided closest to the object side within said first lens group.

11. The imaging optical system according to claim 10, wherein said positive second lens group further includes a positive lens element on the image side of said cemented lens.

* * * * *